US011556649B2

(12) United States Patent
Lancioni et al.

(10) Patent No.: US 11,556,649 B2
(45) Date of Patent: Jan. 17, 2023

(54) METHODS AND APPARATUS TO FACILITATE MALWARE DETECTION USING COMPRESSED DATA

(71) Applicant: McAfee, LLC, Santa Clara, CA (US)

(72) Inventors: German Lancioni, San Jose, CA (US); Pablo A. Michelis, Santa Clara, CA (US)

(73) Assignee: MCAFEE, LLC, San Jose, CA (US)

(*) Notice: Subject to any disclaimer, the term of this patent is extended or adjusted under 35 U.S.C. 154(b) by 87 days.

(21) Appl. No.: 16/725,757

(22) Filed: Dec. 23, 2019

(65) Prior Publication Data
US 2021/0192048 A1    Jun. 24, 2021

(51) Int. Cl.
G06F 21/56 (2013.01)
G06F 21/55 (2013.01)
H03M 7/30 (2006.01)

(52) U.S. Cl.
CPC .......... *G06F 21/567* (2013.01); *G06F 21/552* (2013.01); *G06F 21/562* (2013.01); *G06F 2221/034* (2013.01); *H03M 7/30* (2013.01)

(58) Field of Classification Search
None
See application file for complete search history.

(56) References Cited

U.S. PATENT DOCUMENTS

| | | | |
|---|---|---|---|
| 6,971,092 B1* | 11/2005 | Chilimbi | G06F 11/3471 714/E11.203 |
| 8,555,385 B1* | 10/2013 | Bhatkar | G06F 21/556 726/25 |
| 8,825,848 B1* | 9/2014 | Dotan | G06F 21/577 709/224 |
| 9,697,100 B2* | 7/2017 | Puri | G06F 11/0751 |
| 10,963,566 B2* | 3/2021 | Agrawal | G06N 3/08 |
| 2009/0031162 A1* | 1/2009 | Bose | G06F 21/568 714/2 |

(Continued)

OTHER PUBLICATIONS

Martinradev et al, "Parquet encoding definitions," [https://github.com/apache/parquet-format/blob/master/Encodings.md], Dec. 3, 2019, 8 pages.

*Primary Examiner* — Michael Pyzocha
(74) *Attorney, Agent, or Firm* — Hanley, Flight & Zimmerman, LLC

(57) ABSTRACT

Methods, apparatus, systems and articles of manufacture are disclosed to facilitate malware detection using compressed data. An example apparatus includes an input processor to obtain a model, the model identifying a first sequence associated with a first trace of data known to be repetitive, a sequence identifier to identify a second sequence associated with a second trace of data, a comparator to compare the first sequence with the second sequence, and an output processor to when the first sequence matches the second sequence, transmit an encoded representation of the second sequence to the central processing facility using a first channel of communication, and when the first sequence fails to match the second sequence, transmit the second sequence to the central processing facility using a second channel of communication, the second sequence to be analyzed by the central processing facility to identify whether the second sequence is indicative of malware.

20 Claims, 11 Drawing Sheets

(56) References Cited

U.S. PATENT DOCUMENTS

| | | | | |
|---|---|---|---|---|
| 2009/0254970 A1* | 10/2009 | Agarwal | ............... | G06F 21/554 726/1 |
| 2010/0229239 A1* | 9/2010 | Rozenberg | ............ | G06F 21/552 726/24 |
| 2011/0321166 A1* | 12/2011 | Capalik | ............... | H04L 63/1416 726/25 |
| 2013/0160125 A1* | 6/2013 | Likhachev | ............ | G06F 21/564 726/24 |
| 2014/0143608 A1* | 5/2014 | Grawrock | ........... | G06F 11/3636 714/45 |
| 2016/0359875 A1* | 12/2016 | Kim | ....................... | G06F 21/566 |
| 2017/0206354 A1* | 7/2017 | Pieczul | ................... | G06N 5/04 |
| 2018/0019931 A1* | 1/2018 | Jalan | ..................... | H04L 43/106 |
| 2018/0041536 A1* | 2/2018 | Berlin | ...................... | G06N 3/08 |
| 2018/0046800 A1* | 2/2018 | Aoki | ......................... | G06F 21/56 |
| 2018/0069875 A1* | 3/2018 | Ben Ezra | ............ | H04L 63/1441 |
| 2018/0316694 A1* | 11/2018 | Thakar | ................... | G06F 21/56 |
| 2020/0104639 A1* | 4/2020 | Didari | .................. | G06K 9/6257 |
| 2021/0089654 A1* | 3/2021 | Khedkar | ................. | G06F 21/563 |
| 2021/0117544 A1* | 4/2021 | Kurtz | ..................... | G06F 21/567 |
| 2021/0176260 A1* | 6/2021 | Pan | ..................... | H04L 63/0853 |

* cited by examiner

METHODS AND APPARATUS TO FACILITATE MALWARE DETECTION USING COMPRESSED DATA

FIELD OF THE DISCLOSURE

This disclosure relates generally to malware detection, and, more particularly, to methods and apparatus to facilitate malware detection using compressed data.

BACKGROUND

Malware (e.g., viruses, worms, trojans, ransomware) is software that is disseminated by attackers to launch a wide range of security attacks, such as stealing user's private information, hijacking devices remotely to deliver massive spam emails, infiltrating a user's online account credentials, etc. The introduction of malware to a computing system may cause serious damages and significant financial loss to computer and/or Internet users.

Figure 1:
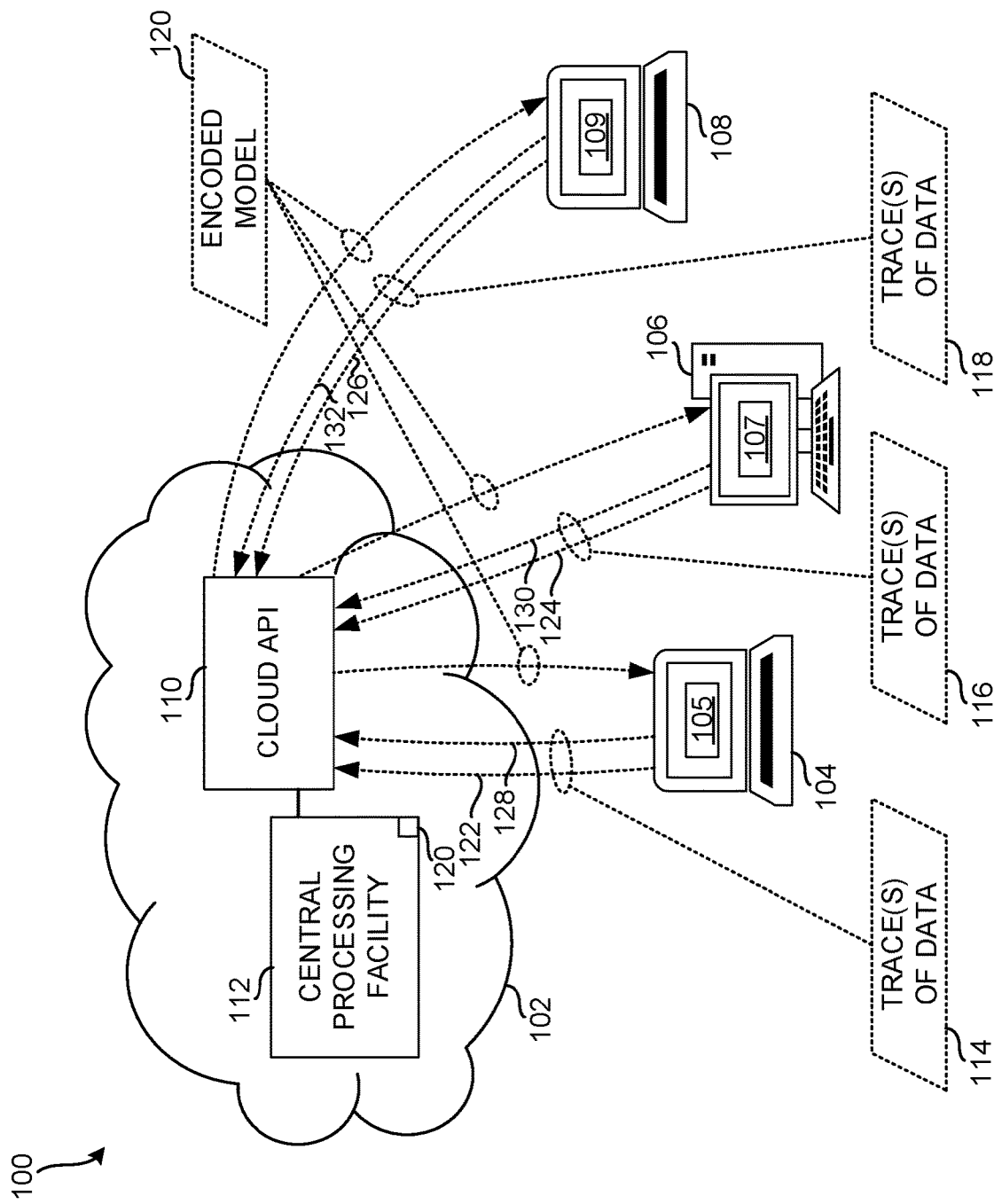
FIG. 1 illustrates an example environment including a cloud network and example endpoint devices.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Malware may enable an attacker to obtain user's private information, hijack devices remotely to deliver massive spam emails, infiltrate a user's online account credentials, etc. The introduction of malware to a computing system may cause serious damage and significant financial loss to computer and/or Internet users.

Some applications to detect malware involve analyzing computing behavior obtained from one or more endpoint device(s) (e.g., client devices). In such an application, the one or more endpoint device(s) typically send a trace of data (e.g., in the format of a JavaScript Object Notation (JSON) file) to a central processing facility. The trace of data identifies one or more process(es) (e.g., sequences, behaviors, etc.) that occur in subsequent order on the endpoint device. For example, a trace of data may identify a process (e.g., sequence, behavior, etc.) such as (a) open a word processing application and (b) select "Equations" tab. Such processes included in the traces of data may be referred to as a sequence, a sequence of events, a sequence of activities, or a behavior.

In practice, most traces of data are similar and recurrent, regardless of the endpoint. Therefore, the observed traces of data (e.g., traces of data sent by endpoint devices to a central processing facility) typically identify a small set of common behaviors collected repeatedly over time originating from successive usages on the same endpoint or across multiple endpoints. For example, the top 150-200 known traces of data (e.g., know behaviors such as, for example, accessing a webpage on the Internet, etc.) account for over 95% of traces of data across multiple endpoints. Typically, the central processing facility that obtains data (e.g., traces of data) from the endpoints stores each instance of a trace of data, regardless of whether the trace of data is repetitive.

Malware detection engines configured to analyze stored traces of data typically operate using a single input data pipeline. Such malware detection engines obtain each instance of a trace of data sent by an endpoint for both known repetitive and known abnormal traces of data. As used herein, an abnormal trace of data refers to a trace of data that is not repetitive enough to satisfy a threshold. For example, if a first trace of data is found in 80% of a total of traces of data, such a trace of data may be identified as satisfying the threshold and, thus, referred to as repetitive. Likewise, if a second trace of data is found in 5% of a total amount of traces of data, such a second trace of data may be identified as not satisfying the threshold and, thus, referred to as abnormal. In other examples disclosed herein, any suitable threshold may be utilized to identify whether a trace of data is repetitive or abnormal. In some examples, an abnormal trace of data may have a higher probability of being malicious than a repetitive trace of data. This is a compute-intensive task that places significant operating stress on the central processing facility.

Examples disclosed herein employ filtering and compression techniques to identify repetitive traces of data versus non-repetitive (e.g., possibly abnormal) traces of data. Thus, examples disclosed herein significantly reduce the amount of data sent by endpoints to the central processing facility. In this manner, examples disclosed herein significantly reduce the amount of data subsequently stored by the central processing facility.

Examples disclosed herein include generating a model corresponding to repetitive traces of data. In examples disclosed herein, the model may be implemented as a graph including nodes and relationships between nodes. In examples disclosed herein, a node is assigned a weight associated with the likelihood of repetition. For example, a first node may identify a first process. Further, the model may identify the possibility of a second node (e.g., a second process) or a third node (e.g., a third process), each being subsequent processes from the first node. As such, a first trace of data including the first node and the subsequent second node may be assigned a first weight. Furthermore, a second trace of data including the first node and the subsequent third node may be assigned a second weight. In examples disclosed herein, when generating the model, any of the weights corresponding to any of the traces of data may be adjusted based on the repetition of the trace of data. In this manner, traces of data that are highly repetitive can be included in a model and associated with an increased weight. Such traces of data have a high likelihood of corresponding to "normal" endpoint activity. Similarly, traces of data that are not highly repetitive may be excluded from the model, or, included in the model with a low weight. In this manner, large amounts of data containing numerous traces of data can be compressed into a single model that includes weights corresponding to the frequency with which each trace of data occurs.

Furthermore, examples disclosed herein include assigning a code to the traces of data included in the model. For example, if a first trace of data corresponds to a behavior sequence such as (a) connect to the Internet and (b) open a web browsing engine, such a trace of data (e.g., a sequence) may be assigned with and/or otherwise represented as a code (e.g., "010"). As used herein, compression refers to assigning, encoding, and/or otherwise representing a file or a part of a file (e.g., a trace of data and/or sequence) with a code, identifier, etc. Examples disclosed herein include further generating a table including the relationship between assigned code and trace of data (e.g., sequence).

Examples disclosed herein include transmitting and/or otherwise sending the model, along with the table including the relationship between assigned codes and traces of data (e.g., sequence) to one or more endpoint device(s). In examples disclosed herein, the one or more endpoint device (s) encode the model using the table to analyze internal traces of data. In this manner, the one or more endpoint device(s) can individually determine whether traces of data correspond to (e.g., match traces of data in the model) known repetitive behavior. In examples disclosed herein, if the one or more endpoint device(s) successfully correlate the internal trace of data (e.g., a trace of data internal to the one or more endpoint device(s)) with a trace of data existing in the model, the one or more endpoint device(s) can encode such an internal trace of data as repetitive.

Examples disclosed herein include a communication channel (e.g., a pipeline) in which one or more endpoint device(s) can transmit traces of data. In examples disclosed herein, the communication channel (e.g., the pipeline) facilitates transmission of compressed and/or uncompressed traces of data. In such an example, the communication channel (e.g., pipeline) may be implemented as two separate communication channels configured to transmit compressed (e.g., encoded) and uncompressed (e.g., non-encoded) data, respectively (e.g., a first pipeline to transmit compressed trace data and a second pipeline to transmit uncompressed trace data). For example, one or more endpoint device(s) can transmit compressed data (e.g., a code corresponding to a trace of data) to a central processing facility. In a similar example, one or more endpoint device(s) can transmit an uncompressed trace of data (e.g., a trace of data not included in the model, and, thus not encoded) through a second communication channel. Similarly, a central processing facility can transmit compressed data (e.g., a code corresponding to a trace of data) to one or more endpoint device(s). In a similar example, the central processing facility can transmit an uncompressed trace of data (e.g., a trace of data not included in the model, and, thus not encoded) through a second communication channel.

Examples disclosed herein enable efficient queries of data stored in a model generated by a central processing facility. For example, behavior associated with a first trace of data not included in the model may be associated with malicious behavior. Likewise, in some examples, behavior associated with a second trace of data included in the model may also be malicious. For example, such a behavior associated with a second trace of data may no longer be repetitive (e.g., due to a software update causing such a behavior to be obsolete) and, thus, the second trace of data stored in the model can be queried. In this manner, additional detail corresponding to the behavior can be analyzed. For example, the central processing facility may identify time stamps, places of origin, neighboring traces of data, when analyzing a trace of data stored in the model.

FIG. 1 illustrates an example environment 100 including a cloud network 102 and example endpoint devices 104, 106, 108. The environment 100 of FIG. 1 further includes an example cloud application programming interface (API) 110, and an example central processing facility 112. In examples disclosed herein, the example endpoint devices 104, 106, 108 include example trace analyzers 105, 107, 109, respectively. In examples disclosed herein, the trace analyzers 105, 107, 109 of the endpoint devices 104, 106, 108 may communicate with the cloud API 110 and/or the central processing facility 112 via any suitable wired and/or wireless communication method. For example, the trace analyzers 105, 107, 109 of the respective endpoint devices 104, 106, 108 are configured to transmit example trace(s) of data 114, 116, 118, respectively, to the cloud API 110 and/or central processing facility 112. While FIG. 1 illustrates three example endpoint devices 104, 106, 108 in communication with the central processing facility, any suitable number of endpoints, client devices, and/or computing devices may be utilized. For example, there may be more or fewer endpoint devices communicating with the cloud API 110 and/or the central processing facility 112.

In the example illustrated in FIG. 1, the cloud network 102 is a distributed computing system that can be utilized to deliver services and/or computational power to one or more of the endpoint devices 104, 106, 108. For example, the cloud 102 can be implemented by one or more servers in a network. The cloud 102 is communicatively coupled to the endpoint devices 104, 106, 108 and the respective trace analyzers 105, 107, 109 via the cloud API 110. In some examples, the cloud network 102 is a public cloud computing environment. In other examples, the cloud network 102 is a private cloud computing environment. In additional or alternative examples, the cloud network 102 is a hybrid cloud computing environment that includes a combination of public and private cloud computing environments. A cloud provider associated with a client can provide various services including infrastructure-as-a-surface (IaaS), platform-as-a-service (PaaS), and software-as-a-service (SaaS) via the cloud network 102. Cloud providers include Amazon Web Services® (AWS®), Microsoft Azure®, Google Cloud Platform™, VMware®, IBM Cloud™, and/or any other suitable cloud provider.

In the example illustrated in FIG. 1, the endpoint devices 104, 106, 108 are computing devices configured to transmit example trace(s) of data 114, 116, 118 to the cloud network 102. In examples disclosed herein, the endpoint devices 104, 106, 108 can implement a workstation, a personal computer, a tablet computer, a smartphone, a laptop, and/or any other type of computing device. In order to facilitate the transfer of respective trace(s) of data 114, 116, 118, the trace analyzers 105, 107, 109 of the respective endpoint devices 104, 106, 108 can communicate with the central processing facility 112 via the cloud API 110. For example, any of the trace analyzers 105, 107, 109 may execute a call to the cloud API 110 and/or execute an operation in response to a call from the cloud API 110 and/or a user.

In the example illustrated in FIG. 1, the example cloud API 110 is configured by administrators, users, and/or other endpoints to interact and/or otherwise communicate with the endpoint devices 104, 106, 108 and/or the central processing facility 112. The cloud API 110 facilitates communications between the central processing facility 112 and one or more of the end point devices 104, 106, 108). The cloud API 110 can support Hypertext Transfer Protocol (HTTP) and HTTP over Secure Sockets Layer (SSL) (HTTPS) communication protocols. In examples disclosed herein, the cloud API 110 includes two databases configured to store repetitive trace(s) of data and abnormal trace(s) of data, respectively. Further, each of the two databases is accessible via separate channels of communication. For example, the trace analyzers 105, 107, 109 of the respective endpoint devices 104, 106, 108 may transmit known repetitive traces of data to a first database in the cloud API 110 via a first communication channel. Likewise, the trace analyzers 105, 107, 109 of the respective endpoint devices 104, 106, 108 may transmit known abnormal traces of data to a second database in the cloud API 110. Such example communication channels are described below in connection with the first communication channel 122, 124, 126 and the second communication channel 128, 130, 132. Further, such example databases in the cloud API 110 are described below in connection with FIG. 3. In some examples, the cloud API 110 can be implemented by one or more analog or digital circuit(s), logic circuits, programmable processor(s), programmable controller(s), GPU(s), DSP(s), ASIC(s), PLD(s) and/or FPLD(s).

In the example of FIG. 1, the central processing facility 112 can be implemented by one or more servers. For example, the central processing facility 112 can be implemented as a datacenter including computing devices, telecommunications systems, storage systems, databases, and/or other computing devices. In other examples, the central processing facility 112 can be implemented by one or more analog or digital circuit(s), logic circuits, programmable processor(s), programmable controller(s), GPU(s), DSP(s), ASIC(s), PLD(s) and/or FPLD(s). In operation, the central processing facility 112 is configured to generate an example encoded model 120 (e.g., a compressed model) that corresponds to the repetitive trace(s) of data 114, 116, 118. In this manner, the central processing facility 112 analyzes the trace(s) of data 114, 116, 118 to identify respective ones of the trace(s) of data 114, 116, 118, or subsets of the respective ones of the trace(s) of data 114, 116, 118, that occur often. The trace(s) of data 114, 116, 118, or subset of the trace(s) of data 114, 116, 118 that occur often may have a high probability of corresponding to normal (e.g., non-malicious) computing activity. As such, the encoded model 120 may be described as a compressed representation of the trace(s) of data 114, 116, 118, or subset of the trace(s) of data 114, 116, 118 that likely correspond to normal (e.g., non-malicious) computing activity. However, in some examples disclosed herein, the encoded model 120 may include abnormal traces of data. For example, if a first trace of data previously identified as repetitive is obsolete (e.g., a software update causes such a first trace of data to be obsolete), such a first trace of data may become abnormal. In examples disclosed herein, the encoded model 120 is transmitted to at least one of the endpoint devices 104, 106, 108 via the cloud API 110. Example operation of the central processing facility 112 is described in further detail below, in connection with FIG. 2.

The example trace(s) of data 114, 116, 118 transmitted by the trace analyzers 105, 107, 109 of the endpoint devices 104, 106, 108, respectively, may be transmitted in the form of a JSON file. In examples disclosed herein, the trace(s) of data 114, 116, 118 can identify one or more process(es) (e.g., behaviors) that occur on the respective endpoint device 104, 106, 108. The traces of data 114, 116, 118 additionally identify an order for the processes (e.g., behaviors). For example, the trace(s) of data 114, 116, 118 may identify a process such as (a) open a word processing application and (b) select "Equations" tab. Such processes included in the trace(s) of data 114, 116, 118 may be referred to as a sequence, a sequence of events, a sequence of activities, or a behavior.

Illustrated in FIG. 1, the trace(s) of data 114, 116, 118 may be transmitted to and/or from the cloud API 110 via an example first channel of communication 122, 124, 126, respectively. Alternatively, the trace(s) of data 114, 116, 118 may be transmitted to and/or from the cloud API 110 via an example second channel of communication 128, 130, 132, respectively. In examples disclosed herein, the first channel of communication 122, 124, 126 is a communication channel (e.g., a wired communication path, a wireless communication network) configured to facilitate the transmission of the trace(s) of data 114, 116, 118, respectively, in an uncompressed format. In examples disclosed herein, the second channel of communication 128, 130, 132 is a communication channel (e.g., a wired communication path, a wireless communication network) configured to facilitate the transmission of the trace(s) of data 114, 116, 118 in a compressed (e.g., encoded) format. While FIG. 1 illustrates the first channel of communication 122, 124, 126 as separate from the second channel of communication 128, 130, 132, in examples disclosed herein, the first channel of communication 122, 124, 126 and the second channel of communication 128, 130, 132 may be implemented as a single channel of communication. For example, the first channel of communication 122, 124, 126 and the second channel of communication 128, 130, 132 may illustrate a single communication channel in which the trace(s) of data 114, 116, 118 can be transmitted in either a compressed (e.g., encoded) or uncompressed (e.g., non-encoded) format. Further, the first channel of communication 122, 124, 126 and the second channel of communication 128, 130, 132 may be implemented as a single virtual communication channel (e.g., a WLAN network), a single physical communication channel (e.g., a physical ethernet connection), multiple virtual communication channels, multiple physical communication channels, and/or any combination of virtual and/or physical communication channels.

In an example operation of the example environment 100, initially the trace analyzers 105, 107, 109 of the respective endpoint devices 104, 106, 108 transmit the trace(s) of data 114, 116, 118 to the cloud API 110 via the first channel of communication 122. As such, the central processing facility 112 obtains all trace(s) of data 114, 116, 118 in an uncompressed format for use in generating the encoded model 120. In this manner, the central processing facility 112 communicates with the cloud API 110 to identify repetitive trace(s) of data within the trace(s) of data 114, 116, 118. Such identified trace(s) of data are included in the encoded model 120. Example generation of the encoded model 120 is explained in further detail below.

Further in such an example operation, the trace analyzers 105, 107, 109 of the respective endpoint devices 104, 106, 108 obtain the encoded model 120 representative of repetitive trace(s) of data. The trace analyzers 105, 107, 109 can then compare new internal trace(s) of data with the encoded model 120 to identify whether any of the new internal trace(s) of data are match a known repetitive trace of data. As used herein, internal trace(s) of data (e.g., the new internal trace(s) of data) refer to traces of data generated on the endpoint devices 104, 106, 108 that are to be compared with the encoded model 120. In FIG. 1, a first portion of the trace(s) of data 114, 116, 118 that correspond to repetitive trace(s) of data (e.g., a first portion of the trace(s) of data 114, 116, 118 that include a sequence in the encoded model 120), are further compressed (e.g., encoded with a code) and transmitted to the cloud API 110 via the second channel of communication 128, 130, 132. For example, a first portion of the trace(s) of data 114, 116, 118 that correspond to repetitive trace(s) of data (e.g., a first portion of the trace(s) of data 114, 116, 118 that include a sequence in the encoded model 120), may be assigned with and/or otherwise represented as a code (e.g., "010"). Such a code may be transmitted to the cloud API 110 via the second channel of communication 128, 130, 132. Likewise, a second portion of the trace(s) of data 114, 116, 118 that correspond abnormal trace(s) of data (e.g., a second portion of the trace(s) of data 114, 116, 118 that include a sequence not in the encoded model 120), are transmitted to the cloud API 110 via the first channel of communication 122 to the cloud API 110.

Figure 2:
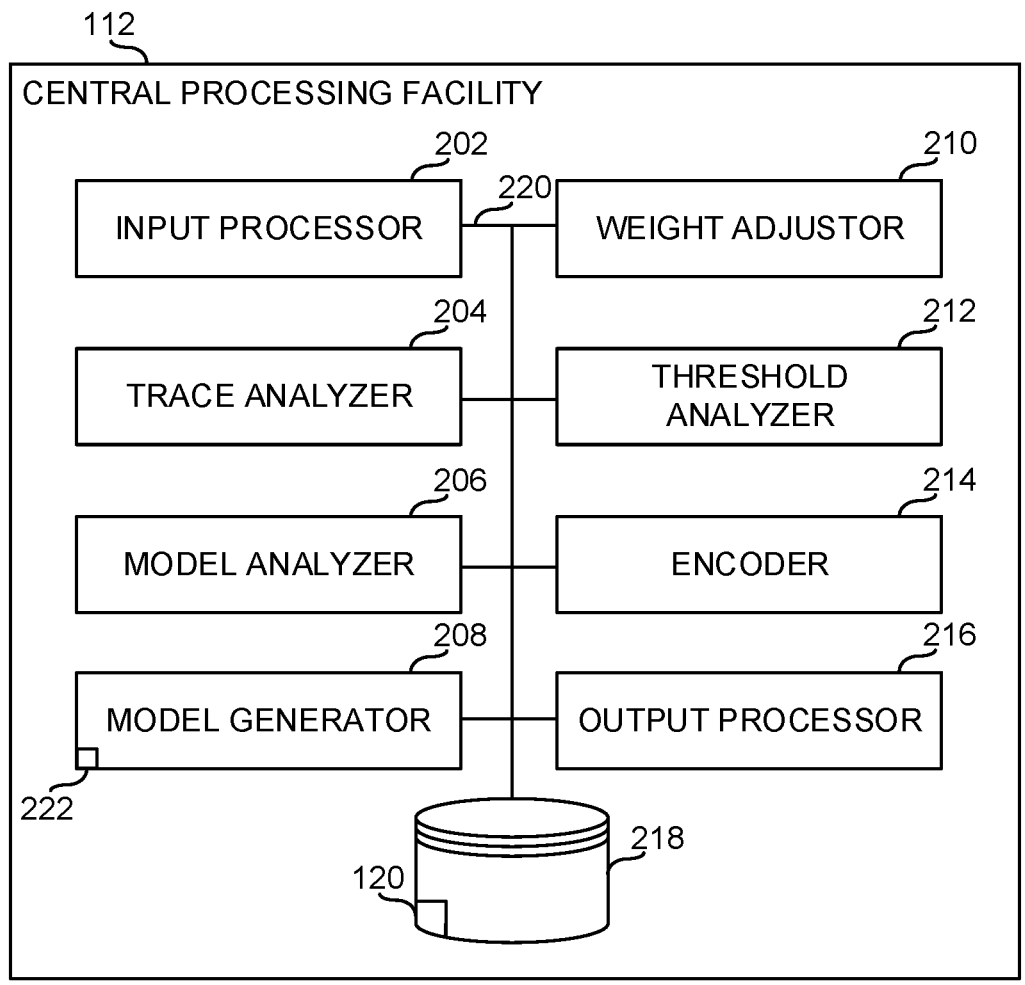
FIG. 2 is an example block diagram of an example implementation of the central processing facility of FIG. 1.

FIG. 2 is an example block diagram of an example implementation of the central processing facility 112 of FIG. 1. The central processing facility 112 includes an example input processor 202, an example trace analyzer 204, an example model analyzer 206, an example model generator 208, an example weight adjustor 210, an example threshold analyzer 212, an example encoder 214, an example output processor 216, and an example model datastore 218. In FIG. 2, any of the input processor 202, the trace analyzer 204, the model analyzer 206, the model generator 208, the weight adjustor 210, the threshold analyzer 212, the encoder 214, the output processor 216, and/or the model datastore 218 may communicate via an example communication bus 220.

In examples disclosed herein, the communication bus 220 may be implemented using any suitable wired and/or wireless communication method.

In the example illustrated in FIG. 2, the input processor 202 can be implemented by one or more computing devices. In FIG. 2, the input processor 202 is configured to communicate with the cloud API 110 to obtain any stored trace(s) of data. For example, the input processor 202 communicates with the cloud API 110 to obtain the traces(s) of data 114, 116, 118 (FIG. 1) from the cloud API 110. In examples disclosed herein, input processor 202 is configured to transmit the trace(s) of data 114, 116, 118 to any of the trace analyzer 204, the model analyzer 206, the model generator 208, the weight adjustor 210, the threshold analyzer 212, the encoder 214, the output processor 216, and/or the model datastore 218 via the communication bus 220. For example, the input processor 202 transmits the trace(s) of data 114, 116, 118 to the trace analyzer 204 for further processing. In examples disclosed herein, the input processor 202 may implement example means for processing.

In the example of FIG. 2, the trace analyzer 204 can be implemented by one or more computing devices. In operation, the trace analyzer 204 is configured to analyze the trace(s) of data 114, 116, 118 obtained by the input processor 202. For example, the trace analyzer 204 analyzes each individual trace of data obtained by the input processor 202 to determine the behavior and/or otherwise sequence associated with the individual trace of data. For example, if the input processor 202 obtains a group of fifteen traces of data in the traces of data 114 sent from the endpoint device 104, then the trace analyzer 204 analyzes each fifteen traces of data to identify the fifteen corresponding behaviors and/or otherwise sequences. In examples disclosed herein, the trace analyzer 204 communicates such identified behaviors and/or otherwise sequences to the input processor 202, the model analyzer 206, the model generator 208, the weight adjustor 210, the threshold analyzer 212, the encoder 214, the output processor 216, and/or the model datastore 218 via the communication bus 220. In examples disclosed herein, the trace analyzer 204 may implement example means for trace analyzing.

In addition, the example trace analyzer 204 may analyze the trace(s) of data 114, 116, 118 to identify whether any of the trace(s) of data 114, 116, 118 are malicious. For example, responsive to an uncompressed trace of data obtained by any one of the endpoint devices 104, 106, 108, the trace analyzer 204 may implement any suitable method to identify whether such an uncompressed trace of data is indicative of malware. In such an example, the trace analyzer 204 may communicate with the cloud API 110 to retrieve and/or otherwise obtain stored traces of data.

In FIG. 2, the example model analyzer 206 can be implemented by one or more computing devices. In operation, the model analyzer 206 is configured to communicate with the trace analyzer 204 to identify the corresponding behaviors and/or otherwise sequences of the input trace(s) of data 114, 116, 118. Prior to the generation of an example preliminary model 222 or the example encoded model 120, the model analyzer 206 can determine that the preliminary model 222 or the encoded model 120 are not yet generated and, as such, that the recently identified behaviors and/or sequences of the input traces of data are yet be included in the preliminary model 222 or the encoded model 120. In such an event, the model analyzer 206 communicates with the model generator 208 to ensure the obtained traces of data (e.g., the obtained trace(s) of data 114, 116, 118) are included when generating the preliminary model 222. For example, if no preliminary model 222 or encoded model 120 exist at the time of analyzing, the model analyzer 206 can determine that the identified behavior and/or otherwise sequence is not yet present in the preliminary model 222 or the encoded model 120. Such an example identification is sent to the model generator 208 to include the identified behavior and/or otherwise sequence when generating the preliminary model 222. In examples disclosed herein, the model analyzer 206 may implement example means for model analyzing.

Alternatively, in the event the preliminary model 222 or the encoded model 120 is present (e.g., an encoded model has been previously generated), the model analyzer 206 is configured to compare any analyzed behaviors and/or otherwise sequences determined by the trace analyzer 204 to the behaviors and/or otherwise sequences in either the preliminary model 222 or the encoded model 120.

In the example illustrated in FIG. 2, the model generator 208 can be implemented by one or more computing devices. The model generator 208 is configured to generate the preliminary model 222. Initially when the preliminary model 222 has not been generated, the model generator 208 is configured to generate the preliminary model 222 (e.g., in the form of a state diagram or state map). For example, each of the identified behaviors and/or otherwise sequences included in the obtained trace(s) of data 114, 116, 118 each include a series of tasks executed to implement the behavior and/or otherwise sequence. For example, a trace of data may include a behavior and/or otherwise sequence such as "save document." As such, the behavior may include states such as (1) "open document" and (2) "select the save button." Thus, the model generator 208 can generate the preliminary model 222 in the form of a state diagram or state map including nodes and edges illustrating the behavior (1) "open document" and (2) "select the save button." In the event the preliminary model 222 has been previously generated by the model generator 208, the model generator 208 may add a new sequence and/or otherwise behavior identified by the model analyzer 206 into the preliminary model 222 if the sequence and/or behavior satisfies a repetition threshold. Alternatively, in the event the preliminary model 222 has been previously generated by the model generator 208, the model generator 208 may remove a sequence and/or otherwise behavior from the preliminary model 222 if the sequence and/or behavior does not satisfy a repetition threshold. Further, such example nodes are the states and such example edges define the relationships between states. In examples disclosed herein, the preliminary model 222 may be a Markov chain and/or Markov model. The preliminary model 222 is explained in further detail below, in connection with FIG. 4. In examples disclosed herein, the model generator 208 may implement example means for generating.

In yet another example, in the event the model analyzer 206 identifies that a sequence and/or otherwise behavior is already included in the preliminary model 222 (e.g., two trace(s) of data each correspond to the same behavior and/or task executed twice by a user of one of the endpoint devices 104, 106, 108 to create two similar trace(s) of data, etc.), the model analyzer 206 communicates such a behavior and/or otherwise sequence to the weight adjustor 210.

In the example illustrated in FIG. 2, the weight adjustor 210 can be implemented by one or more computing devices. In operation, the weight adjustor 210 obtains an indication from the model analyzer 206 when an identified behavior and/or otherwise sequence of the obtained trace(s) of data is already included in the preliminary model 222. The weight adjustor 210 is configured to update a weight of the corresponding sequence to indicate the repetitiveness of such a behavior and/or otherwise sequence. In examples disclosed herein, the weight adjustor 210 may implement example means for adjusting.

Once the preliminary model 222 is generated (e.g., the model generator 208 includes all distinct behaviors and/or otherwise sequences of data of the obtained trace(s) of data in the preliminary model 222 and the weight adjustor 210 completes adjustment of similar behaviors and/or otherwise sequences of data), the threshold analyzer 212 is configured to analyze the weights of each behaviors and/or otherwise sequences in the preliminary model 222. In this manner, the threshold analyzer 212 determines whether the weight satisfies a threshold. For example, a lower weight indicating that a sequence does not occur often may not satisfy (e.g., fails to satisfy) the threshold. Similarly, a higher weight indicating that the sequence occurs often may satisfy the threshold. If the threshold analyzer 212 identifies a behavior and/or otherwise sequence in the preliminary model 222 including a weight that does not satisfy the weight threshold, the threshold analyzer 212 communicates such an identification to the model generator 208. In this manner, the model generator 208 can remove the behavior and/or otherwise sequence from the preliminary model 222. The resulting preliminary model 222 thus includes all behaviors and/or otherwise sequences in the trace(s) of data 114, 116, 118 that are repetitive. In examples disclosed herein, the threshold analyzer 212 may implement example means for threshold analyzing.

In the example illustrated in FIG. 2, the encoder 214 can be implemented by one or more computing devices. In operation, the encoder 214 is configured to obtain the preliminary model 222 from the model generator 208. In response, the encoder 214 is configured to encode each behavior and/or sequence in the preliminary model 222 to generate an example corresponding code (e.g., a sequence code). For example, the encoder 214 may execute a suitable encoding function (e.g., leveraging a function available in Apache Parquet, etc.) to generate the example codes. In response, the encoder 214 is configured to generate the example encoded model 120 by compressing the traces of data when encoding with the generated example codes. In some examples disclosed herein, the encoder 214 may match the codes with the behaviors and/or otherwise sequences on a Huffman tree. Furthermore, the encoder 214 generates an example table including the relationship between behavior and/or otherwise sequence and the corresponding code. In examples disclosed herein, the encoder 214 may implement example means for encoding.

In other examples disclosed herein, the encoder 214 may generate the encoded model 120 by identifying a fingerprint, a header, and/or a set of variable data associated with each trace of data in the preliminary model 222. For example, the encoder 214 may identify a fingerprint (e.g., a code) associated with the sequence of the trace of data by executing the below equation, Equation 1.

$$\exists e(x), \text{such given } t_i \text{ trace}, e(t_i)=et_i / \wedge e^{-1}(et_i)=t_i \qquad \text{Equation 1}$$

In Equation 1, the variable t corresponds to a trace of data and the variable i corresponds to an index of the trace of data. In addition the encoder 214 may identify header information (e.g., extract header information) from each trace of data. As used herein, header information corresponds to a subset of properties associated with a trace of data that may be a shared property across all traces of data. The encoder 214 may extract header information using the below equation, Equation 2.

$$\exists h(x), \text{such given trace sequence } t=[t_1,\ldots,t_k], h(t)=H \quad \text{Equation 2}$$

In Equation 2, the variable H corresponds to the extracted header information. Further, the encoder 214 may identify variable data associated with a trace of data. As used herein, variable data corresponds to data associated with a trace of data that may not be relevant to the sequence and/or behavior. For example, variable data may include a timestamp, etc. The encoder 214 may extract variable data using the below equation, Equation 3.

$$\exists v(x), \text{such given } t_i \text{ trace}, v(t_i)=[vt_1,\ldots,vt_k] \quad \text{Equation 3}$$

In Equation 3, the variable v corresponds to the variable data associated with a time stamp. Additionally, the encoder may identify a code (e.g., a descriptor) for each trace of data using the below equation, Equation 4.

$$\exists fp(x), \text{such given trace sequence } t=[t_1,\ldots,t_k], fp(t)=fp_j \quad \text{Equation 4}$$

In Equation 4, the variable p corresponds to the descriptor associated with the trace of data. In examples disclosed herein, the execution of control illustrated in Equations 1-4 may be performed by the encoder 214 to generate the encoded model 120 and/or corresponding table.

In the example illustrated in FIG. 2, the output processor 216 can be implemented by one or more computing devices. In examples disclosed herein, the output processor 216 is configured to transmit the encoded model 120 and/or the corresponding table (e.g., the table including the relationship between behavior and/or otherwise sequence and the corresponding code) to the endpoint devices 104, 106, 108. In examples disclosed herein, the output processor 216 may implement example means for output processing.

In the example illustrated in FIG. 2, the model datastore 218 may be implemented by any device for storing data such as, for example, flash memory, magnetic media, optical media, etc. Furthermore, the data stored in the example model datastore 218 may be in any data format such as, for example, binary data, comma delimited data, tab delimited data, structured query language (SQL) structures, etc. In examples disclosed herein, the model datastore 218 is configured to store the encoded model 120 generated by the encoder 214. The model datastore 218 is also configured to store the table (e.g., the table including the relationship between behavior and/or otherwise sequence and the corresponding code) generated by the encoder 214 in the model datastore. Additionally, while the preliminary model 222 is illustrated with the model generator 208, in some examples disclosed herein the model datastore 218 may also store the preliminary model 222. In examples disclosed herein, the model datastore 218 may implement example means for storing.

Figure 3:
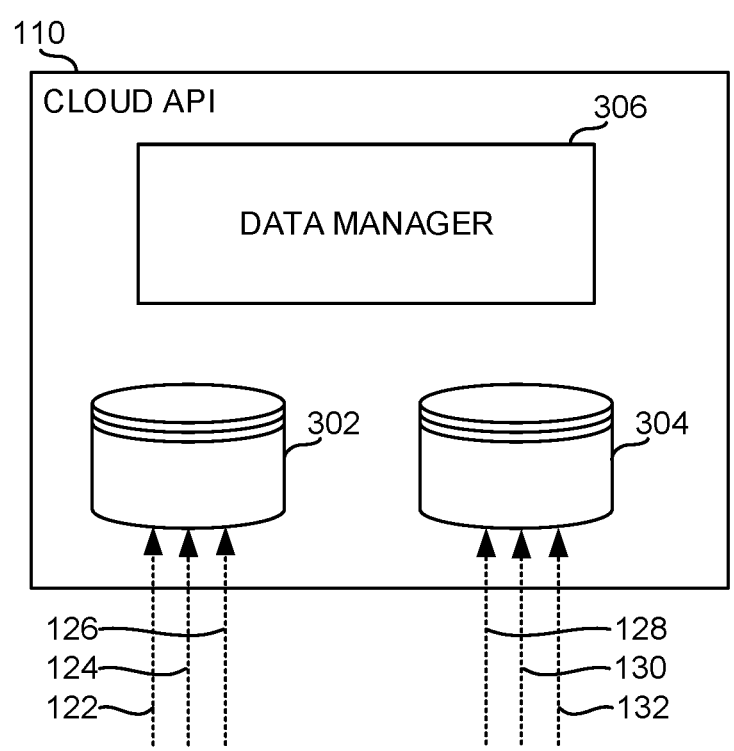
FIG. 3 is a block diagram of an example implementation of the example cloud API of FIG. 1.

FIG. 3 is a block diagram of an example implementation of the example cloud API 110 of FIG. 1. In the example of FIG. 3, the cloud API 110 includes an example first database 302, an example second database 304, and an example data manager 306.

In the example illustrated in FIG. 3, the first database 302 may be implemented by any device for storing data such as, for example, flash memory, magnetic media, optical media, etc. Furthermore, the data stored in the example first database 302 may be in any data format such as, for example, binary data, comma delimited data, tab delimited data, structured query language (SQL) structures, etc. In examples disclosed herein, the first database 302 is configured to store the trace(s) of data 114, 116, 118 (FIG. 1) sent via the example first channel of communication 122, 124, 126. In examples disclosed herein, the first database 302 may implement first example means for storing.

In the example illustrated in FIG. 3, the second database 304 may be implemented by any device for storing data such as, for example, flash memory, magnetic media, optical media, etc. Furthermore, the data stored in the example second database 304 may be in any data format such as, for example, binary data, comma delimited data, tab delimited data, structured query language (SQL) structures, etc. In examples disclosed herein, the second database 304 is configured to store the trace(s) of data 114, 116, 118 (FIG. 1) sent via the example second channel of communication 128, 130, 132. In examples disclosed herein, the second database 304 may implement second example means for storing.

While FIG. 3 illustrates an example first datastore 302 and an example second datastore 304, any suitable number of datastores or storage devices may be utilized to implement the cloud API 110.

In the example illustrated in FIG. 3, the data manager 306 is configured to solve and/or otherwise execute a query request to identify a trace of data (e.g., one of the trace(s) of data 114, 116, 118) from a first model database. In examples disclosed herein, the data manager 306 may initially solve a query (e.g., a request including tenant, filter[ ], free_text, etc.) by applying free text search and field-based filtering on the fields that are part of the code (e.g., the fingerprint identified using Equations 1-4, the code). As such, the data manager 306 utilizes decoding functions on the known steps for each code (e.g., fingerprints identified using Equations 1-4, the code) on current and past encoded models.

Additionally, the data manager 306 manages the relationship between compressed traces of data and codes, header data and variable data (e.g., the fingerprint, header, and variable data identified using Equations 1-4, code, etc.).

Furthermore, the data manager 306 filters stored trace(s) of data based on the code (e.g., the fingerprints identified using Equations 1-4) and/or a time range. The data manager 306 applies a free text search to the trace(s) of data based on the headers identified (e.g., the headers identified using Equation 2). In this manner, filtering based on the code, time range, and/or header identified enable the data manager 306 to efficiently analyze a subset of trace(s) of data without having to parse through all trace(s) of data.

The data manager 306 applies a free text search to the traces(s) of data based on the variable data identified (e.g., the variable data identified using Equation 3). As a result, the data manager combines all results (e.g., the results of the filtering, free text search, etc.) into a single result. In examples disclosed herein, the data manager 306 may implement example means for managing.

Figure 4:
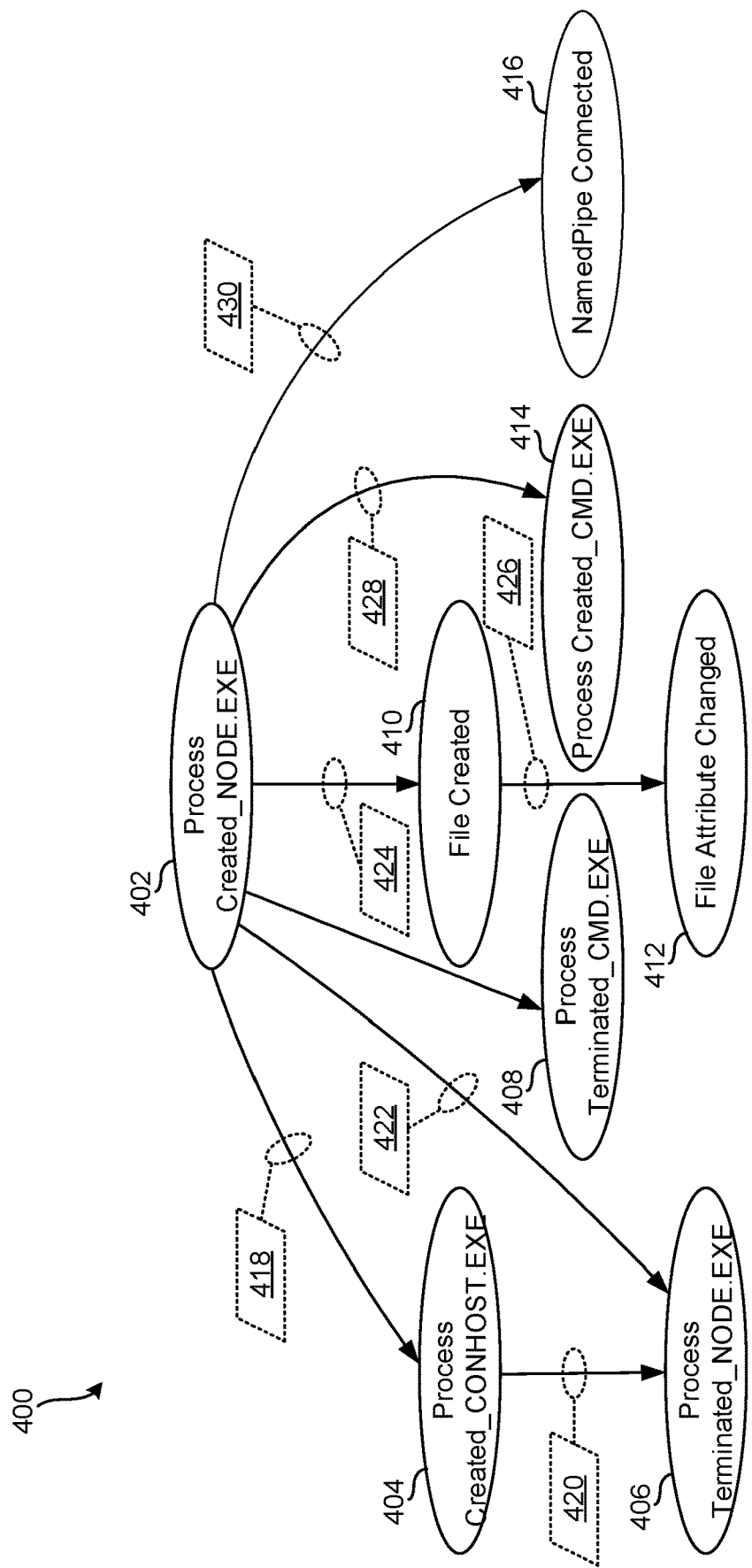
FIG. 4 is a diagram illustrating an example preliminary model.

FIG. 4 is a diagram illustrating an example preliminary model 400. In FIG. 4, the preliminary model 400 may represent an example of the preliminary model 222 illustrated and described in connection with FIG. 2. The preliminary model 400 includes an example first node 402, an example second node 404, an example third node 406, an example fourth node 408, an example fifth node 410, an example sixth node 412, an example seventh node 414, and an example eighth node 416.

In the example of FIG. 4, the first node 402 is the task "Process Created_NODE.EXE," the second node 404 is the task "Process Created_CONHOST.EXE," the third node 406 is the task "Process Terminated_NODE.EXE," the fourth node 408 is the task "Process Terminated_CMD.EXE," the fifth node 410 is the task "File Created," the sixth node 412 is the task "File Attribute Changed," the seventh node 414 is the task "Process Created_CMD.EXE," and the eighth node 416 is the task "NamedPipe Connected." In other examples disclosed herein, there may be any suitable number of nodes, or each of the first node 402, the second node 404, the third node 406, the fourth node 408, the fifth node 410, the sixth node 412, the seventh node 414, and/or the eighth node 416 may execute any suitable task.

The example preliminary model 400 illustrated in FIG. 4 depicts relationships between respective nodes (e.g., the first node 402, the second node 404, the third node 406, the fourth node 408, the fifth node 410, the sixth node 412, the seventh node 414, and/or the eighth node 416) in a graphical illustration. For example, a first sequence (e.g., a sequence identified in one of the trace(s) of data 114, 116, 118 of FIG. 1) may consist of the first node 402 and the second node 404. Each corresponding relationship between nodes (e.g., the first node 402, the second node 404, the third node 406, the fourth node 408, the fifth node 410, the sixth node 412, the seventh node 414, and/or the eighth node 416) is associated with a weight. For example, the execution of node 402 and, subsequently, node 404 is a first sequence. Likewise, the execution of node 402, node 404 and, subsequently, node 406 is a second sequence. Example weight indicators 418, 420, 422, 424, 426, 428, 430 may be example weights assigned by the weight adjustor 210 of FIG. 1.

In examples disclosed herein, the weight indicators 418, 420, 422, 424, 426, 428, 430 correspond to a frequency that the associated relationships occurs. For example, the weight indicator 426 corresponds to a frequency that the sixth node 412 occurs in subsequent execution to the fifth node 410. In examples disclosed herein, any of the weight indicators 418, 420, 422, 424, 426, 428, and/or 430 may be adjusted in response to obtaining traces of data (e.g., the trace(s) of data 114, 116, 118) that include the same sequence.

While an example manner of implementing the cloud network 102 FIG. 1 is illustrated in FIGS. 2 and/or 3, one or more of the elements, processes and/or devices illustrated in FIG. 2 and/or 3 may be combined, divided, re-arranged, omitted, eliminated and/or implemented in any other way. Further, the example input processor 202, the example trace analyzer 204, the example model analyzer 206, the example model generator 208, the example weight adjustor 210, the example threshold analyzer 212, the example encoder 214, the example output processor 216, the example model datastore 218, and/or, more generally, the example central processing facility 112 of FIGS. 1 and/or 2, and/or the example first database 302, the example second database 304, the example data manager 306, and/or, more generally, the example cloud API 110 of FIGS. 1 and/or 3 may be implemented by hardware, software, firmware and/or any combination of hardware, software and/or firmware. Thus, for example, any of the example input processor 202, the example trace analyzer 204, the example model analyzer 206, the example model generator 208, the example weight adjustor 210, the example threshold analyzer 212, the example encoder 214, the example output processor 216, the example model datastore 218, and/or, more generally, the example central processing facility 112 of FIGS. 1 and/or 2, and/or the example first database 302, the example second database 304, the example data manager 306, and/or, more generally, the example cloud API 110 of FIGS. 1 and/or 3 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input processor 202, the example trace analyzer 204, the example model analyzer 206, the example model generator 208, the example weight adjustor 210, the example threshold analyzer 212, the example encoder 214, the example output processor 216, the example model datastore 218, and/or, more generally, the example central processing facility 112 of FIGS. 1 and/or 2, and/or the example first database 302, the example second database 304, the example data manager 306, and/or, more generally, the example cloud API 110 of FIGS. 1 and/or 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cloud network 102 FIG. 1 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
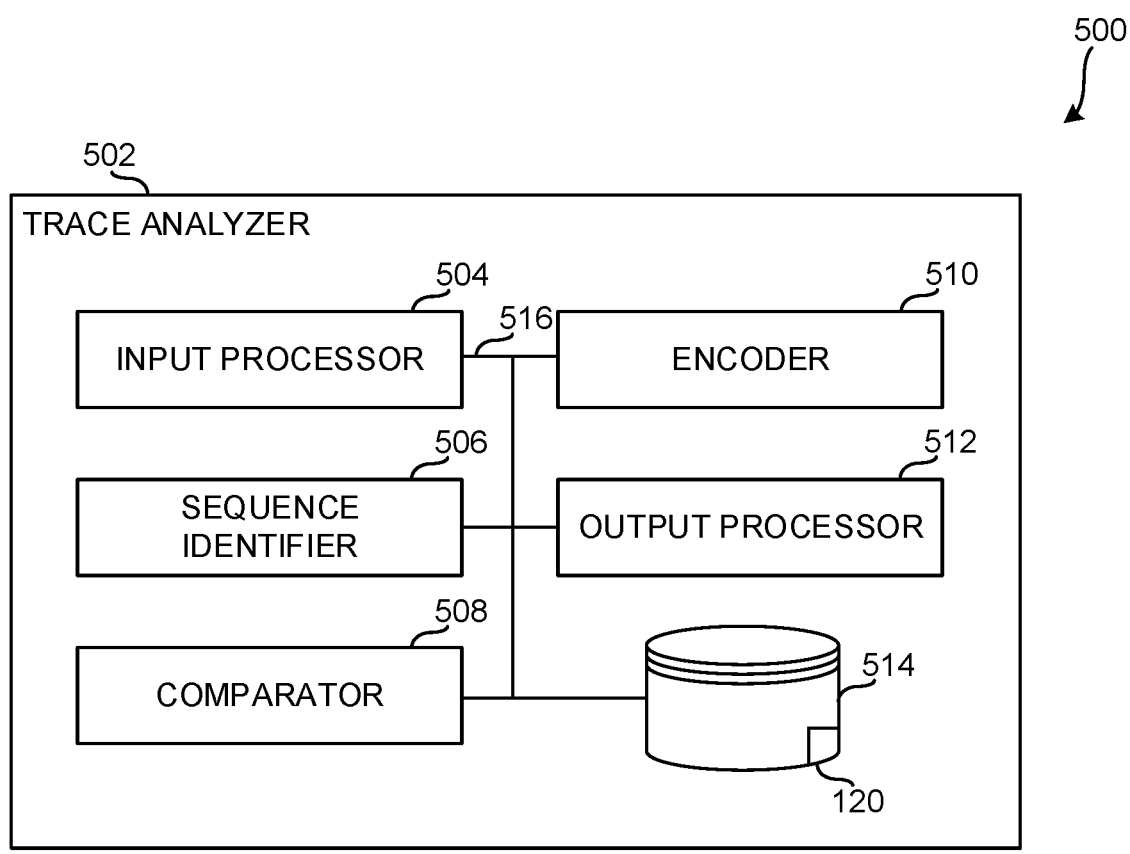
FIG. 5 is an example block diagram of an example implementation of the example trace analyzer configured to analyze trace(s) of data an endpoint device.

FIG. 5 is an example block diagram illustrating an example trace analyzer 502 configured to analyze trace(s) of data an endpoint device. For example, the trace analyzer 502 may be any of the trace analyzer 105, the trace analyzer 107, and/or the trace analyzer 109 of FIG. 1. The trace analyzer 502 includes an example input processor 504, an example sequence identifier 506, an example comparator 508, an example encoder 510, an example output processor 512, and an example datastore 514. In FIG. 5, any of the input processor 504, the sequence identifier 506, the comparator 508, the encoder 510, the output processor 512, and/or the datastore 514 may communicate via an example communication bus 516. In examples disclosed herein, the communication bus 516 may be implemented using any suitable wired and/or wireless communication method. In examples disclosed herein, the trace analyzer 502 may implement example means for analyzing.

In the illustrated example of FIG. 5, the input processor 504 can be implemented by one or more computing devices. In an example operational phase, the input processor 504 is configured to determine whether an encoded model (e.g., the encoded model 120 of FIG. 1) and corresponding table have been obtained (e.g., whether the encoded model 120 and corresponding table have been obtained from the central processing facility 112 of FIG. 1). In the event the input processor 504 determines the encoded model (e.g., the encoded model 120) or the corresponding table is not received, the input processor 504 may communicate with the output processor 512 to obtain the encoded model (e.g., the encoded model 120) and/or the corresponding table. In examples disclosed herein, the input processor 504 may implement example means for input processing.

In FIG. 5, the example sequence identifier 506 can be implemented by one or more computing devices. Prior to, or in a subsequent action to, the input processor 504 obtaining the encoded model (e.g., the encoded model 120) and/or corresponding table, the sequence identifier 506 obtains internal traces of data. As used herein, internal traces of data refer to traces of data originating on a respective endpoint device (e.g., one of the endpoint devices 104, 106, 108) that are analyzed by the trace analyzer 502. For example, once the trace(s) of data 114, 116, 118 of FIG. 1 are transmitted to the central processing facility 112, and the central processing facility 112 generates the example encoded model 120, the sequence identifier 506 then obtains any internal traces of data on the corresponding endpoint device (e.g., any of the endpoint device 104, 106, 108 of FIG. 1). In this manner, the sequence identifier 506 obtains internal traces of data that have not been utilized in generation of the encoded model (e.g., the encoded model 120). The internal traces of data obtained by the sequence identifier 506 may be compared against the encoded model (e.g., the encoded model 120) to determine whether the internal traces of data include a sequence and/or behavior that is repetitive or abnormal. In examples disclosed herein, the sequence identifier 506 may implement example means for identifying.

Further in an example operational phase, the sequence identifier 506 analyzes the internal traces of data (e.g., traces of data internal to the corresponding endpoint device 104, 106, 108), to identify the associated internal sequence. As used herein, internal sequence refers to the sequence and/or behavior included in an internal trace of data. In an example operational phase, the sequence identifier 506 transmits the analyzed internal sequence and/or behavior to the comparator 508 for further processing.

In the illustrated example of FIG. 5, the comparator 508 can be implemented by one or more computing devices. In an example operational phase, the comparator 508 obtains the encoded model 120 and/or corresponding table from the input processor 504. Alternatively, the comparator 508 may obtain the encoded model (e.g., the encoded model 120) and/or corresponding table from any of the sequence identifier 506, the comparator 508, the encoder 510, the output processor 512, and/or the datastore 514. In an example operational phase, the comparator 508 parses the encoded model 120 and/or table to identify the relationship between sequence and code. For example, the encoded model 120 is an encoded representation of the preliminary model 222 (FIG. 2). As such, the comparator 508 can parse the encoded model 120, along with the corresponding table, to identify the sequence in the encoded model 120. For example, the encoded model may include a code "010." Such a corresponding table can include the relationship between the code "010" and the actual sequence. For example, the code "010" may correspond to the sequence "Task A, Task B, Task C."

In this manner, the comparator 508 can compare the internal sequence and/or behavior (e.g., the internal sequence identified by the sequence identifier 506) with the sequence from the encoded model (e.g., the encoded model 120) to determine whether the internal sequence and/or behavior (e.g., the internal sequence identified by the sequence identifier 506) matches a sequence from the encoded model (e.g., the encoded model 120). In response to the comparator 508 determining the internal sequence and/or behavior matches a sequence in the encoded model (e.g., the encoded model 120), the comparator 508 transmits a corresponding indication of the internal sequence to the encoder 510. In alternate examples, the comparator 508 may transmit the internal sequence, rather than a corresponding indication of the internal sequence, to the encoder 510 in response to determining the internal sequence and/or behavior matches a sequence in the encoded model 120.

Alternatively, in response to the comparator 508 determining the internal sequence and/or behavior does not match a sequence in the encoded model 120 (e.g., the internal sequence and/or behavior is likely an abnormal sequence and/or behavior), the comparator 508 transmits a corresponding indication to the output processor 512 for further processing. In alternate examples, the comparator 508 may transmit the internal sequence, rather than a corresponding indication of the internal sequence, to the encoder 510 in response to determining the internal sequence and/or behavior does not match a sequence in the encoded model 120. In examples disclosed herein, the comparator 508 may implement example means for comparing.

In FIG. 5, the example encoder 510 can be implemented by one or more computing devices. In an example operational phase, the encoder 510 is configured to obtain an indication of the internal sequences that match a sequence in the encoded model 120. In this manner, the encoder 510 is configured to encode the internal sequence with the related code identified in the table. For example, if the table includes code "010," which may correspond to a sequence "Task A, Task B, and Task C," any internal sequences being "Task A, Task B, and Task C" may be encoded with the code "010" by the encoder 510. Such an encoded model 120 may be a compressed model. Such encoded internal sequences may be sent to the datastore 514 and/or the output processor 512. In examples disclosed herein, the encoder 510 may implement example means for encoding.

In the illustrated example of FIG. 5, the output processor 512 can be implemented by one or more computing devices. The output processor 512 is configured to obtain the encoded internal sequences and transmit such encoded internal sequences to the cloud API 110 via a compressed channel of communication (e.g., the second channel of communication 128, 130, 132 of FIG. 1). Likewise, the output processor 512 is configured to obtain the internal sequences that are not encoded (e.g., the internal sequences determined by the comparator 508 to not match a sequence in the encoded model 120) and transmit such internal sequences to the cloud API 110 via an uncompressed channel of communication (e.g., the first channel of communication 122) to the cloud API 110. Additionally, the output processor 512 may transmit either the encoded internal sequences or not encoded internal sequences to the datastore 514 to be stored. In examples disclosed herein, the output processor 512 may implement example means for output processing.

In FIG. 5, the example datastore 514 may be implemented by any device for storing data such as, for example, flash memory, magnetic media, optical media, etc. Furthermore, the data stored in the example datastore 514 may be in any data format such as, for example, binary data, comma delimited data, tab delimited data, structured query language (SQL) structures, etc. In examples disclosed herein, the datastore 514 may store the encoded model 120. Further, the datastore 514 may store the encoded internal sequences and/or not encoded internal sequences for a period of time. For example, the datastore 514 may implement a retention policy in which the encoded internal sequences and/or not encoded internal sequences are stored for a period of time and later removed, deleted, etc. In examples disclosed herein, the datastore 514 may implement example means for storing.

While an example manner of implementing the example trace analyzer 105, 107, 109 of FIG. 1 and/or the example trace analyzer 502 of FIG. 5 is illustrated in FIG. 5, one or more of the elements, processes and/or devices illustrated in FIG. 5 may be combined, divided, re-arranged, omitted, eliminated and/or implemented in any other way. Further, the example input processor 504, the example sequence identifier 506, the example comparator 508, the example encoder 510, the example output processor 512, the example datastore 514, and/or, more generally, the example trace analyzer 105, 107, 109 of FIG. 1 and/or the example trace analyzer 502 of FIG. 5 may be implemented by hardware, software, firmware and/or any combination of hardware, software and/or firmware. Thus, for example, any of the example input processor 504, the example sequence identifier 506, the example comparator 508, the example encoder 510, the example output processor 512, the example datastore 514, and/or, more generally, the example trace analyzer 105, 107, 109 of FIG. 1 and/or the example trace analyzer 502 of FIG. 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input processor 504, the example sequence identifier 506, the example comparator 508, the example encoder 510, the example output processor 512, the example datastore 514, and/or, more generally, the example trace analyzer 105, 107, 109 of FIG. 1 and/or the example trace analyzer 502 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example trace analyzer 105, 107, 109 of FIG. 1 and/or the example trace analyzer 502 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
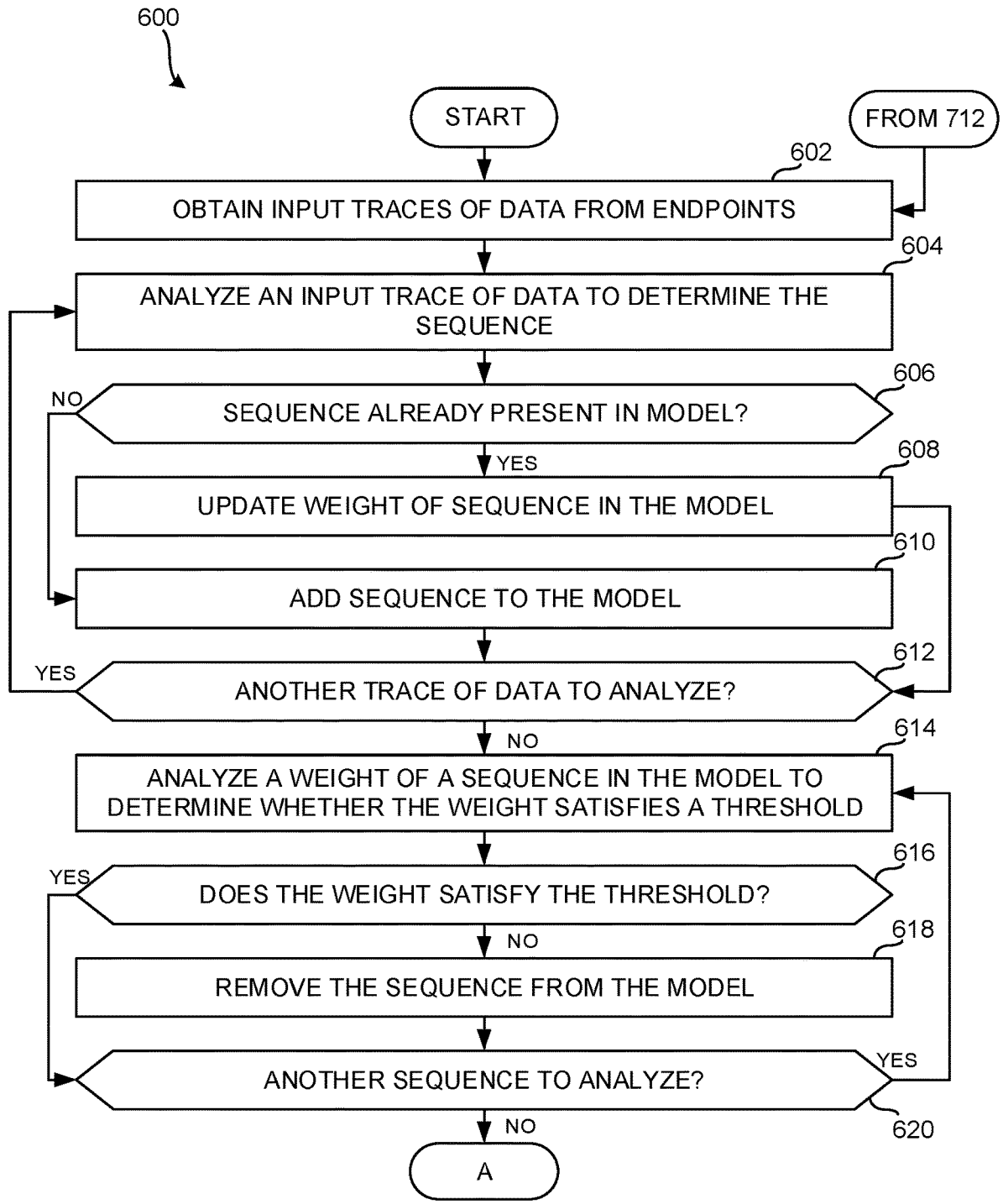
FIG. 6 is a flowchart representative of example machine readable instructions which may be executed to implement the central processing facility of FIGS. 1 and/or 2 to generate and transmit the encoded model to one of the endpoint devices.
Figure 7:
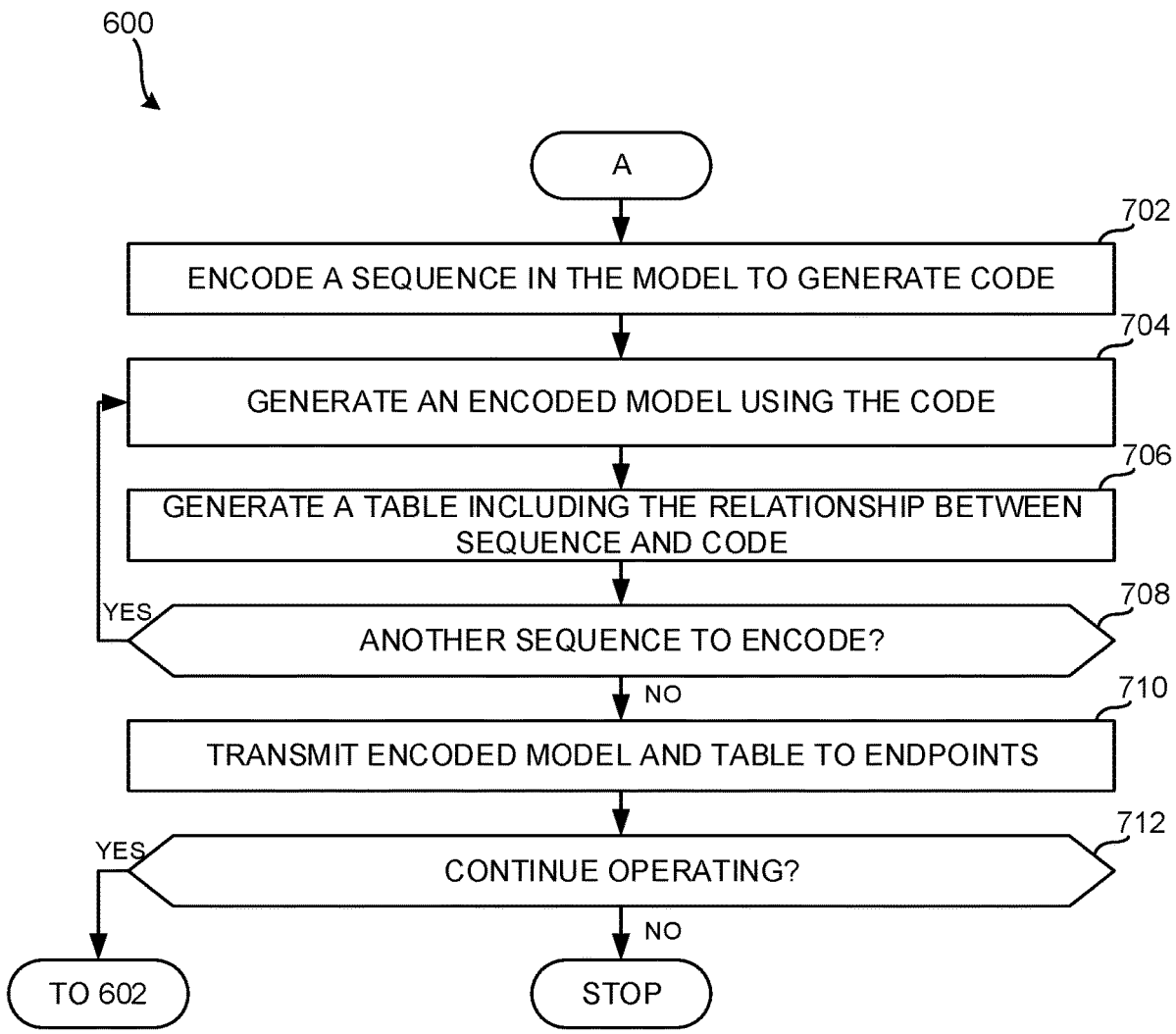
FIG. 7 is a flowchart representative of additional instructions of the example machine readable instructions of FIG. 6 which may be executed to implement the central processing facility of FIGS. 1 and/or 2 to generate and transmit the encoded model to one of the endpoint devices.

Flowcharts representative of example hardware logic, machine readable instructions, hardware implemented state machines, and/or any combination thereof for implementing the cloud network 102 FIG. 1 are shown in FIGS. 6, 7, and/or 8. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6, 7, and/or 8, many other methods of implementing the example cloud network 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7, and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions 600 which may be executed to implement the central processing facility 112 of FIGS. 1 and/or 2 to generate and transmit the encoded model 120 to one of the endpoint devices 104, 106, 108. In FIG. 6, the example input processor 202 obtains stored input traces (e.g., the trace(s) of data 114, 116, 118 (FIG. 1)) from the cloud API 110. (Block 602). For example, the input processor 202 may communicate with the cloud API 110 to obtain any stored trace(s) of data.

At block 604, the trace analyzer 204 analyzes the trace(s) of data 114, 116, 118 obtained by the input processor 202 determine the behavior and/or otherwise sequence associated with the individual trace of data.

At block 606, the model analyzer 206 determines whether the sequence and/or behavior determined in block 604 is present and/or otherwise included in the model (e.g., the preliminary model 222). In the event the model analyzer 206 determines the sequence and/or behavior is present and/or otherwise included in the model (e.g., the control of block 606 returns a result of YES), then the weight adjustor 210 of FIG. 2 updates a weight corresponding to the sequence in the preliminary model 222. (Block 608). Alternatively, in the event the model analyzer 206 determines the sequence and/or behavior is not present and/or otherwise included in the model (e.g., the control of block 606 returns a result of NO), then the model generator 208 adds the sequence and/or otherwise behavior in the preliminary model 222.

In response to the execution of the control illustrated in blocks 608 or 610, control proceeds to block 612, the model analyzer 206 determines whether there is another trace of data to analyze. (Block 612). For example, if the trace(s) of data 114, 116, 118 include two traces of data, control may return to block 604. Accordingly, in the event the model analyzer 206 determines there is another trace of data to analyze (e.g., the control of block 612 returns a result of YES), then control returns to block 604. Alternatively, in the event the model analyzer 206 determines there is not another trace of data to analyze (e.g., the control of block 612 returns a result of NO), then the threshold analyzer 212 configured analyze the weights of each sequence and/or otherwise behavior in the preliminary model 222. (Block 614).

At block 616, the threshold analyzer 212 determines whether the weights satisfy a threshold. In the event the threshold analyzer 212 identifies and/or otherwise determines that a behavior and/or otherwise sequence in the preliminary model 222 includes a weight that does not satisfy the weight threshold (e.g., the control of block 616 returns a result of NO), the model generator 208 removes the behavior and/or otherwise sequence from the preliminary model 222. (Block 618). Alternatively, in the event the threshold analyzer 212 identifies and/or otherwise determines that a behavior and/or otherwise sequence in the preliminary model 222 includes a weight that does satisfy the weight threshold (e.g., the control of block 616 returns a result of YES), the threshold analyzer 212 determines whether there is another sequence and/or otherwise behavior to analyze. (Block 620).

In the event the threshold analyzer 212 determines there is another sequence and/or otherwise behavior to analyze (e.g., the control of block 620 returns a result of YES), control returns to block 614. Alternatively, in the event the threshold analyzer 212 determines there is not another sequence and/or otherwise behavior to analyze (e.g., the control of block 620 returns a result of NO), control proceeds to the instructions described in connection with FIG. 7.

FIG. 7 is a flowchart representative of additional instructions of the example machine readable instructions 600 of FIG. 6 which may be executed to implement the central processing facility 112 of FIGS. 1 and/or 2 to generate and transmit the encoded model 120 to one of the endpoint devices 104, 106, 108. At block 702, the encoder 214 encodes a behavior and/or otherwise sequence in the preliminary model 222 to generate an example corresponding code. In response, the encoder 214 is configured to generate the example encoded model 120 by encoding (e.g., compressing) the trace of data using the generated example codes. (Block 704). In other examples disclosed herein, the encoder 214 may additionally or alternatively execute Equations 1-4 to execute the control illustrated in blocks 702 and/or 704.

At block 706, the encoder 214 generates a table including the relationship between the sequence and the code. In some examples, the encoder 214 may update an existing table in the event a new sequence and/or code is to be added.

At block 708, the encoder 214 determines whether there is another sequence and/or otherwise behavior to encode. In the event the encoder 214 determines there is another sequence and/or otherwise behavior to encode (e.g., the control of block 708 returns a result of YES), control returns to block 704. Alternatively, in the event the encoder 214 determines there is not another sequence and/or otherwise behavior to encode (e.g., the control of block 708 returns a result of NO), the output processor 216 transmits the encoded model 120 and/or the corresponding table (e.g., the table including the relationship between behavior and/or otherwise sequence and the corresponding code) to the endpoint devices 104, 106, 108. (Block 710).

At block 712, the central processing facility 112 determines whether to continue operating. In the event the central processing facility 112 determines to continue operating (e.g., the control of block 712 returns a result of YES), control returns to block 602 in FIG. 6. In examples disclosed herein, the central processing facility 112 may determine to continue operating after an elapsed period of time (e.g., to update the encoded model 120 every day, week, etc.). Alternatively, in the event the central processing facility 112 determines not to continue operating (e.g., the control of block 712 returns a result of NO), the process stops. The central processing facility 112 may determine not to continue operating responsive to a shut off event (e.g., power off), a loss of communication, etc.

Figure 8:
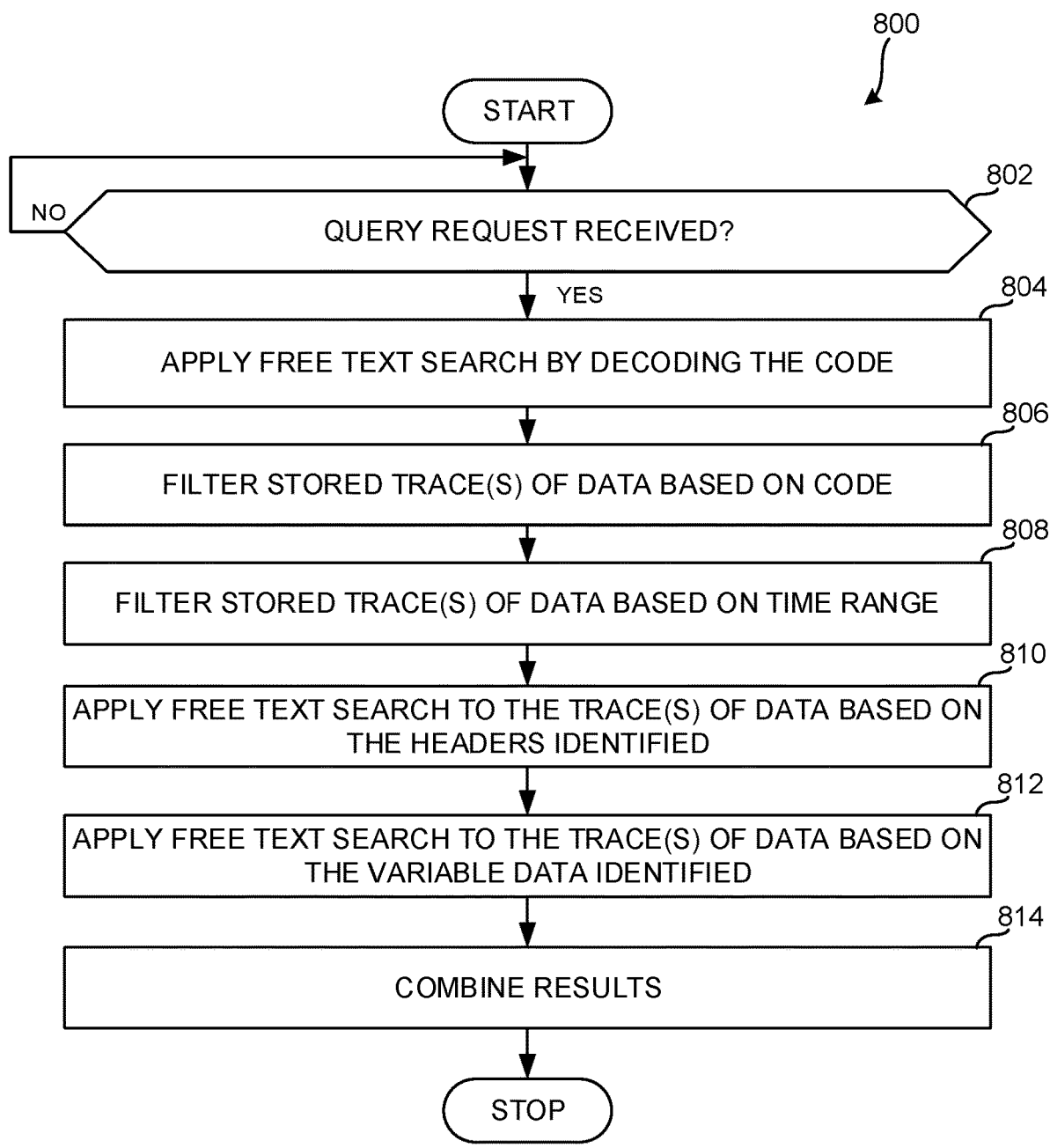
FIG. 8 is a flowchart representative of example machine readable instructions which may be executed to implement the cloud API of FIGS. 1 and/or 3 to manage a query request.

FIG. 8 is a flowchart representative of example machine readable instructions 800 which may be executed to implement the cloud API 110 of FIGS. 1 and/or 3 to manage a query request. In FIG. 8, the example data manager 306 is configured to determine whether a query request is received. (Block 802). For example, a query request may be received in the event a look-up of a trace of data is requested. Such a look-up may occur responsive to a request to analyze the trace of data to identify whether the trace of data is malicious. In examples disclosed herein, a query request may be received to query either an encoded trace of data or a non-encoded trace of data. In the event the data manager 306 determines a query request is not received (e.g., the control of block 802 returns a result of NO), the data manager 306 continues to wait. Alternatively, in the event the data manager 306 determines a query request is received (e.g., the control of block 802 returns a result of YES), the data manager applies a free text search by decoding the code associated with the query request. (Block 804). For example, the data manager 306 may apply a free text search and/or field-based filtering on fields associated with the code (e.g., the fingerprints identified using Equations 1-4).

At block 806, the data manager 306 filters stored trace(s) of data based on the code (e.g., the fingerprints identified using Equations 1-4, the code). At block 808, the data manager 306 filters the stored trace(s) of data based on a time range. For example, the data manager 306 may filter the stored trace(s) of data based on a start time and/or end time filter range.

At block 810, the data manger 306 applies a free text search to the trace(s) of data based on the headers identified (e.g., the headers identified using Equation 2).

At block 812, the data manager 306 applies a free text search to the traces(s) of data based on the variable data identified (e.g., the variable data identified using Equation 3).

At block 814, the data manager combines the results from at least blocks 804, 806, 808, 810, and/or 812 into a single result. The process stops.

Figure 9:
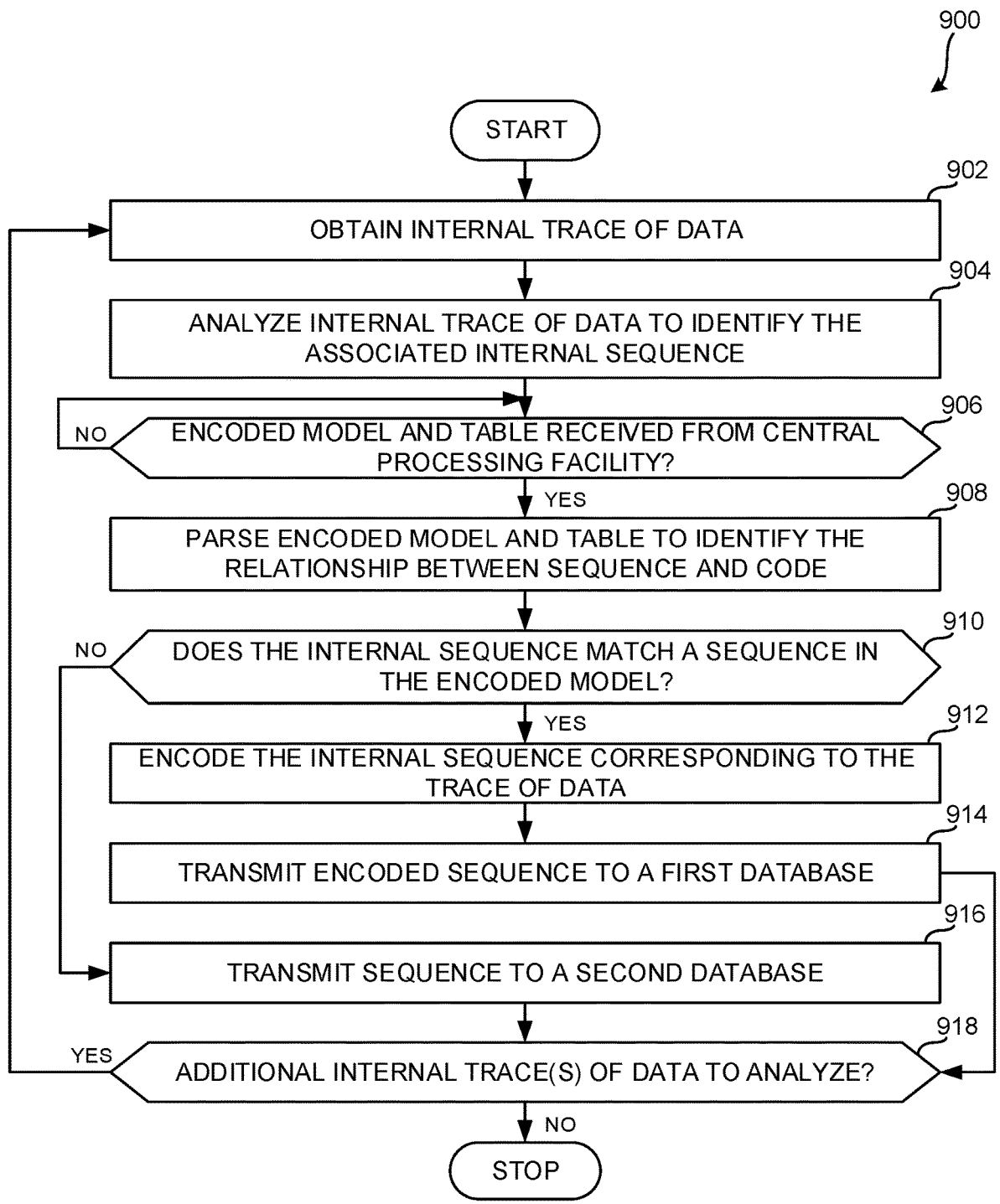
FIG. 9 is a flowchart representative of example machine readable instructions which may be executed to implement the example trace analyzer of FIG. 1 and/or the trace analyzer of FIG. 5 to transmit trace(s) of data to the cloud network.

A flowchart representative of example hardware logic, machine readable instructions, hardware implemented state machines, and/or any combination thereof for implementing the trace analyzer 105, 107, 109 of FIG. 1 and/or the example trace analyzer 502 of FIG. 5 is shown in FIG. 9. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 9, many other methods of implementing the example trace analyzer 105, 107, 109 of FIG. 1 and/or the example trace analyzer 502 of FIG. 5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 9 is a flowchart representative of example machine readable instructions 900 which may be executed to implement the example trace analyzer 105, 107, 109 of FIG. 1 and/or the trace analyzer 502 of FIG. 5 to transmit trace(s) of data to the cloud network 102. While the instruction 900 of FIG. 9 are explained in connection with the trace analyzer 502 of FIG. 5, any of the trace analyzer 105, 107, 109 of FIG. 1 may be utilized to execute the instructions 900 of FIG. 9.

At block 902, the sequence identifier 506 obtains internal traces of data. In response, the sequence identifier 506 analyzes the internal traces of data (e.g., traces of data internal to the corresponding endpoint device 104, 106, 108), to identify the associated internal sequence. (Block 904).

At block 906, the input processor 504 is configured to determine whether an encoded model (e.g., the encoded model 120 of FIG. 1) and corresponding table have been obtained (e.g., whether the encoded model 120 and corresponding table have been obtained from the central processing facility 112 of FIG. 1). In the event the input processor 504 determines the encoded model (e.g., the encoded model 120) or the corresponding table is not received (e.g., the control of block 906 returns a result of NO), the input processor 504 may communicate with the output processor 512 to obtain the encoded model (e.g., the encoded model 120) and/or the corresponding table. For example, in the event the input processor 504 determines the encoded model (e.g., the encoded model 120) or the corresponding table is not received, control waits until the encoded model (e.g., the encoded model 120) and/or corresponding table is received.

Alternatively, in the event the input processor 504 determines the encoded model (e.g., the encoded model 120) or the corresponding table is received (e.g., the control of block 906 returns a result of YES), the comparator 508 parses the encoded model 120 and/or table to identify the relationship between sequence and code. (Block 908). In this manner, the comparator 508 compares the internal sequence and/or behavior (e.g., the internal sequence identified by the sequence identifier 506), with the sequence from the encoded model (e.g., the encoded model 120) to determine if there is a match. (Block 910). In the event the comparator 508 determines the internal sequence and/or behavior does not match a sequence in the encoded model (e.g., the control of block 910 returns a result of NO), control proceeds to block 916. Description of the control illustrated in block 916 is explained in further detail below.

Alternatively, in the event the comparator 508 determines the internal sequence and/or behavior does matches a sequence in the encoded model (e.g., the control of block 910 returns a result of YES), the encoder 510 encodes the internal sequence with the related code identified in the table. (Block 912). For example, if the table includes code "010," which may correspond to a sequence "Task A, Task B, and Task C," any internal sequences being "Task A, Task B, and Task C" may be encoded with the code "010" by the encoder 510. In response, the output processor 512 transmits the encoded sequences to a first database. (Block 914). For example, the output processor 512 may transmit the encoded sequences to the cloud API 110 via a compressed channel of communication (e.g., the second channel of communication 128, 130, 132 of FIG. 1).

At block 916, the output processor 512 transmits the sequence not encoded to the cloud API 110 via an uncompressed channel of communication (e.g., the first channel of communication 122).

In response to the control executed in either block 914 or block 916, the trace analyzer 502 determines whether there is an additional internal trace of data to analyze. (Block 918). In the event the trace analyzer 502 determines there is an additional trace of data to analyze (e.g., the control of block 918 returns a result of YES), control returns to block 902. Alternatively, in the event the trace analyzer 502 determines there is not an additional trace of data to analyze (e.g., the control of block 918 returns a result of NO), the process stops.

Figure 10:
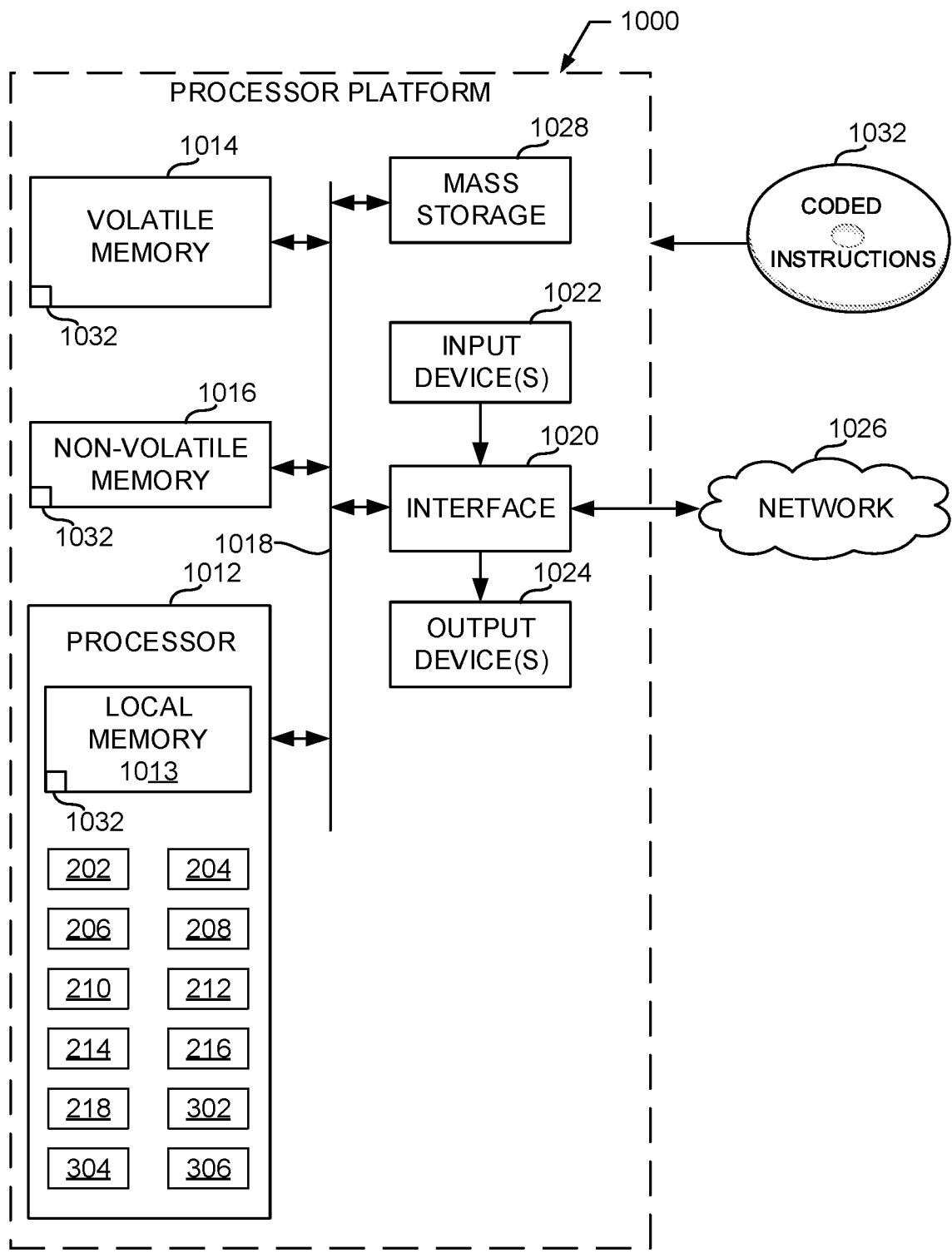
FIG. 10 is a block diagram of an example processor platform structured to execute the instructions of FIGS. 6, 7, and/or 8 to implement the cloud network of FIG. 1.

FIG. 10 is a block diagram of an example processor platform 1000 structured to execute the instructions of FIGS. 6, 7, and/or 8 to implement the cloud network 102 of FIG. 1. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input processor 202, the example trace analyzer 204, the example model analyzer 206, the example model generator 208, the example weight adjustor 210, the example threshold analyzer 212, the example encoder 214, the example output processor 216, the example model datastore 218, and/or, more generally, the example central processing facility 112 of FIGS. 1 and/or 2, and/or the example first database 302, the example second database 304, the example data manager 306, and/or, more generally, the example cloud API 110 of FIGS. 1 and/or 3.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device (s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6, 7, and/or 8 may be stored in the mass storage device 1028, in the volatile memory 1014, in the non-volatile memory 1016, and/or on a removable non-transitory computer readable storage medium such as a CD or DVD.

Figure 11:
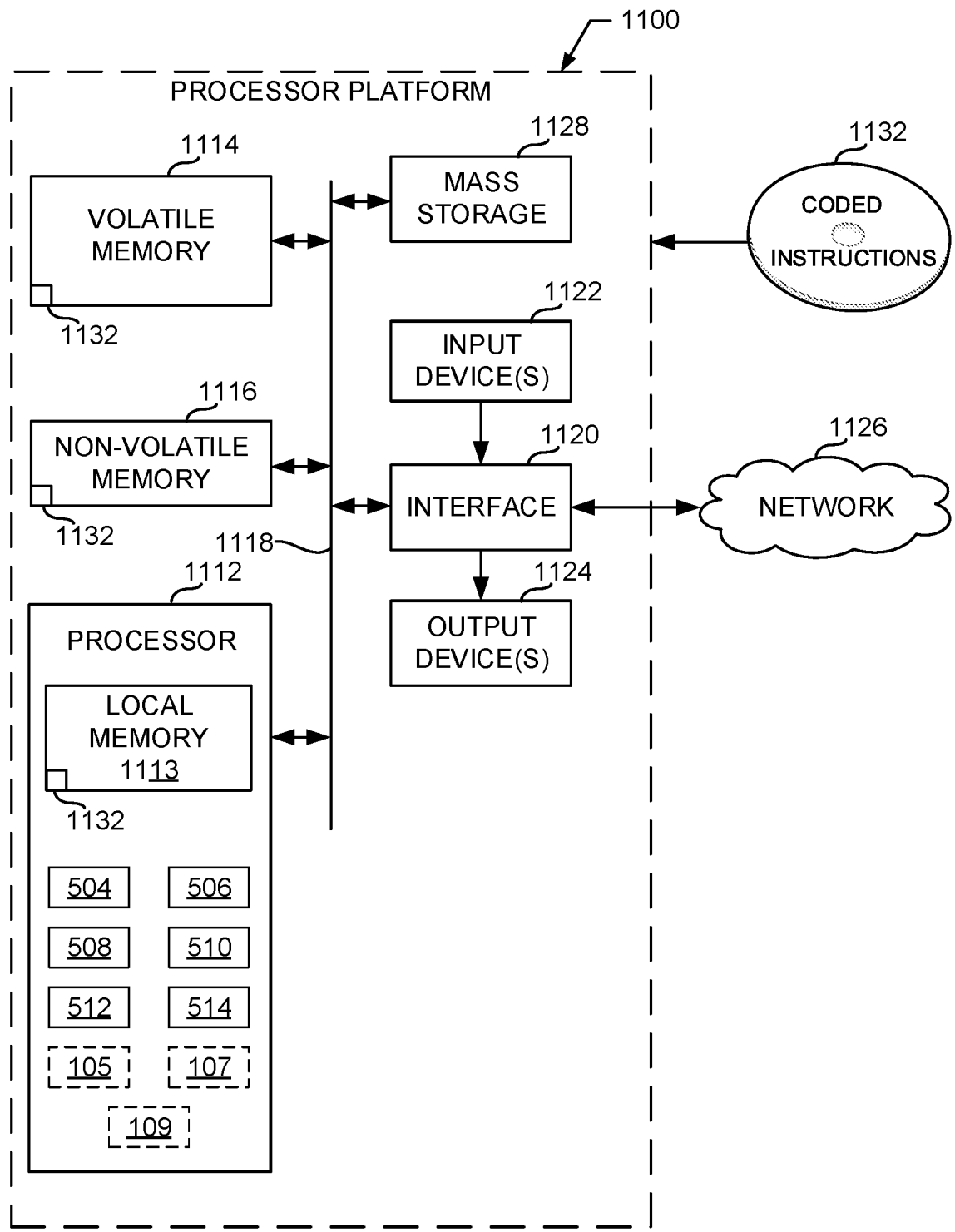
FIG. 11 is a block diagram of an example processor platform structured to execute the instructions of FIG. 9 to implement the trace analyzer of FIG. 1 and/or the example trace analyzer of FIG. 5.

FIG. 11 is a block diagram of an example processor platform 1100 structured to execute the instructions of FIG. 9 to implement the trace analyzer 105, 107, 109 of FIG. 1 and/or the example trace analyzer 502 of FIG. 5. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input processor 504, the example sequence identifier 506, the example comparator 508, the example encoder 510, the example output processor 512, the example datastore 514, and/or, more generally, the example trace analyzer 105, 107, 109 of FIG. 1 and/or the example trace analyzer 502 of FIG. 5.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device (s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that facilitate malware detection using encoded (e.g., compressed) data entries corresponding to known repetitive behavior. The disclosed methods, apparatus and articles of manufacture improve the efficiency of using a computing device by utilizing an encoded model to determine whether a trace of data is repetitive and, thus, likely normal, or determine whether a trace of data is not repetitive and, thus, likely abnormal. In examples disclosed herein, traces of data deemed not repetitive are transmitted through a first, uncompressed channel of communication. Likewise, in examples disclosed herein, traces of data deemed repetitive are encoded (e.g., compressed) and transmitted through a second, compressed channel of communication. Accordingly, rather than storing all traces of data, memory is better utilized by storing encoded (e.g., compressed) traces known to be repetitive and uncompressed traces known to be abnormal. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to facilitate malware detection are disclosed herein. Further examples and combinations thereof include the following:

Example 1 includes an apparatus comprising an input processor to obtain a model from a central processing facility, the model identifying a first sequence associated with a first trace of data known to be repetitive, a sequence identifier to identify a second sequence associated with a second trace of data, a comparator to compare the first sequence with the second sequence, and an output processor to when the first sequence matches the second sequence, transmit an encoded representation of the second sequence to the central processing facility using a first channel of communication, and when the first sequence fails to match the second sequence, transmit the second sequence to the central processing facility using a second channel of communication, the second sequence to be analyzed by the central processing facility to identify whether the second sequence is indicative of malware.

Example 2 includes the apparatus of example 1, wherein the comparator is to obtain the model and a table including a relationship between the first sequence and a code.

Example 3 includes the apparatus of example 2, further including an encoder to encode the second sequence using the code when the first sequence matches the second sequence.

Example 4 includes the apparatus of example 1, wherein the model includes a plurality of sequences.

Example 5 includes the apparatus of example 1, wherein the model is an encoded model, and wherein the comparator is to parse the model to identify the first sequence.

Example 6 includes the apparatus of example 1, further including a datastore to store the second sequence for a period of time.

Example 7 includes the apparatus of example 1, further including a datastore to store the model.

Example 8 includes a non-transitory computer readable storage medium comprising instructions which, when executed, cause at least one processor to at least obtain a model from a central processing facility, the model identifying a first sequence associated with a first trace of data known to be repetitive, identify a second sequence associated with a second trace of data, compare the first sequence with the second sequence, when the first sequence matches the second sequence, transmit an encoded representation of the second sequence to the central processing facility using a first channel of communication, and when the first sequence fails to match the second sequence, transmit the second sequence to the central processing facility using a second channel of communication, the second sequence to be analyzed by the central processing facility to identify whether the second sequence is indicative of malware.

Example 9 includes the non-transitory computer readable storage medium of example 8, wherein the instructions, when executed, cause the at least one processor to obtain the model and a table including a relationship between the first sequence and a code.

Example 10 includes the non-transitory computer readable storage medium of example 9, wherein the instructions, when executed, cause the at least one processor to encode the second sequence using the code when the first sequence matches the second sequence.

Example 11 includes the non-transitory computer readable storage medium of example 8, wherein the model includes a plurality of sequences.

Example 12 includes the non-transitory computer readable storage medium of example 8, wherein the model is an encoded model, and wherein the instructions, when executed, cause the at least one processor to parse the model to identify the first sequence.

Example 13 includes the non-transitory computer readable storage medium of example 8, wherein the instructions, when executed, cause the at least one processor to store the second sequence for a period of time.

Example 14 includes the non-transitory computer readable storage medium of example 8, wherein the instructions, when executed, cause the at least one processor to store the model.

Example 15 includes a method comprising obtaining a model from a central processing facility, the model identifying a first sequence associated with a first trace of data known to be repetitive, identifying a second sequence associated with a second trace of data, comparing the first sequence with the second sequence, when the first sequence matches the second sequence, transmitting an encoded representation of the second sequence to the central processing facility using a first channel of communication, and when the first sequence fails to match the second sequence, transmitting the second sequence to the central processing facility using a second channel of communication, the second sequence to be analyzed by the central processing facility to identify whether the second sequence is indicative of malware.

Example 16 includes the method of example 15, further including obtaining the model and a table including a relationship between the first sequence and a code.

Example 17 includes the method of example 16, further including encoding the second sequence using the code when the first sequence matches the second sequence.

Example 18 includes the method of example 15, wherein the model includes a plurality of sequences.

Example 19 includes the method of example 15, wherein the model is an encoded model, and further including parsing the model to identify the first sequence.

Example 20 includes the method of example 15, further including storing the second sequence for a period of time.

Example 21 includes an apparatus comprising a trace analyzer to analyze a first trace of data to determine a sequence, a weight adjustor to, when the sequence is present in a model, adjust a weight associated with the sequence, a threshold analyzer to determine whether the weight of the sequence satisfies a weight threshold, and an encoder to generate an encoded model by encoding the sequence in response to the threshold analyzer determining the weight of the sequence satisfies the weight threshold, the encoded model to be sent to an endpoint device to facilitate compression of a second trace of data.

Example 22 includes the apparatus of example 21, wherein the trace analyzer is to analyze a third trace of data to determine a second sequence.

Example 23 includes the apparatus of example 22, further including a model generator to, when the second sequence is not present in the model, add the sequence to the model.

Example 24 includes the apparatus of example 21, further including a model generator to remove the sequence responsive to the threshold analyzer determining the weight of the sequence does not satisfy the weight threshold.

Example 25 includes the apparatus of example 21, further including an output processor to transmit the model to the endpoint device via an application programming interface.

Example 26 includes a non-transitory computer readable storage medium comprising instructions which, when executed, cause at least one processor to at least analyze a first trace of data to determine a sequence, when the sequence is present in a model, adjust a weight associated with the sequence, determine whether the weight of the sequence satisfies a weight threshold, and generate an encoded model by encoding the sequence in response to the weight of the sequence satisfying the weight threshold, the encoded model to be sent to an endpoint device to facilitate compression of a second trace of data.

Example 27 includes the non-transitory computer readable storage medium of example 26, wherein the instructions, when executed, cause the at least one processor to analyze a third trace of data to determine a second sequence.

Example 28 includes the non-transitory computer readable storage medium of example 27, wherein the instructions, when executed, cause the at least one processor to, when the second sequence is not present in the model, add the sequence to the model.

Example 29 includes the non-transitory computer readable storage medium of example 26, wherein the instructions, when executed, cause the at least one processor to remove the sequence responsive to determining the weight of the sequence does not satisfy the weight threshold.

Example 30 includes the non-transitory computer readable storage medium of example 26, wherein the instructions, when executed, cause the at least one processor to transmit the model to the endpoint device via an application programming interface.

Example 31 includes a method comprising analyzing a first trace of data to determine a sequence, when the sequence is present in a model, adjusting a weight associated with the sequence, determining whether the weight of the sequence satisfies a weight threshold, and generating an encoded model by encoding the sequence in response to the weight of the sequence satisfying the weight threshold, the encoded model to be sent to an endpoint device to facilitate compression of a second trace of data.

Example 32 includes the method of example 31, further including analyzing a third trace of data to determine a second sequence.

Example 33 includes the method of example 32, further including, when the second sequence is not present in the model, adding the sequence to the model.

Example 34 includes the method of example 31, further including removing the sequence responsive to determining the weight of the sequence does not satisfy the weight threshold.

Example 35 includes the method of example 31, further including transmitting the model to the endpoint device via an application programming interface.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   processor circuitry to execute the instructions to:
   obtain a model from a central processing facility, the model identifying a first sequence of processes executed by a single device associated with a first trace of data known to be repetitive;
   identify a second sequence of processes executed by the single device associated with a second trace of data;
   compare the first sequence with the second sequence;
   when the first sequence matches the second sequence, transmit an encoded representation of the second sequence to the central processing facility using a first channel of communication, wherein the encoded representation is generated based on a header that corresponds to a property included in the first sequence and the second sequence, a fingerprint, a set of variable data including a timestamp associated with the first sequence and the second sequence, and traces of data in a preliminary model; and
   when the first sequence fails to match the second sequence, transmit the second sequence to the central processing facility using a second channel of communication, the second sequence to be analyzed by the central processing facility to identify whether the second sequence is indicative of malware.

2. The apparatus of claim 1, wherein the processor circuitry is to execute the instructions to obtain the model and a table including a relationship between the first sequence and a code.

3. The apparatus of claim 2, wherein the processor circuitry is to execute the instructions to encode the second sequence using the code when the first sequence matches the second sequence.

4. The apparatus of claim 1, wherein the model includes a plurality of sequences.

5. The apparatus of claim 1, wherein the model is an encoded model, and wherein the processor circuitry is to execute the instructions to parse the model to identify the first sequence.

6. The apparatus of claim 1, wherein the processor circuitry is to execute the instructions to store the second sequence for a period of time.

7. The apparatus of claim 1, wherein the processor circuitry is to execute the instructions to store the model.

8. A non-transitory computer readable storage medium comprising instructions which, when executed, cause at least one processor to at least:
   obtain a model from a central processing facility, the model identifying a first sequence of processes executed by a single device associated with a first trace of data known to be repetitive;
   identify a second sequence of processes executed by the single device associated with a second trace of data;
   compare the first sequence with the second sequence;
   when the first sequence matches the second sequence, transmit an encoded representation of the second sequence to the central processing facility using a first channel of communication, wherein the encoded representation is generated based on a header that corresponds to a property included in the first sequence and the second sequence, a fingerprint, a set of variable data including a timestamp associated with the first sequence and the second sequence, and traces of data in a preliminary model; and
   when the first sequence fails to match the second sequence, transmit the second sequence to the central processing facility using a second channel of communication, the second sequence to be analyzed by the central processing facility to identify whether the second sequence is indicative of malware.

9. The non-transitory computer readable storage medium of claim 8, wherein the instructions, when executed, cause the at least one processor to obtain the model and a table including a relationship between the first sequence and a code.

10. The non-transitory computer readable storage medium of claim 9, wherein the instructions, when executed, cause the at least one processor to encode the second sequence using the code when the first sequence matches the second sequence.

11. The non-transitory computer readable storage medium of claim 8, wherein the model includes a plurality of sequences.

12. The non-transitory computer readable storage medium of claim 8, wherein the model is an encoded model, and wherein the instructions, when executed, cause the at least one processor to parse the model to identify the first sequence.

13. The non-transitory computer readable storage medium of claim 8, wherein the instructions, when executed, cause the at least one processor to store the second sequence for a period of time.

14. The non-transitory computer readable storage medium of claim 8, wherein the instructions, when executed, cause the at least one processor to store the model.

15. A method comprising:
   obtaining a model from a central processing facility, the model identifying a first sequence of processes executed by a single device associated with a first trace of data known to be repetitive;
   identifying a second sequence of processes executed by the single device associated with a second trace of data;
   comparing the first sequence with the second sequence;
   when the first sequence matches the second sequence, transmitting an encoded representation of the second sequence to the central processing facility using a first channel of communication, wherein the encoded representation is generated based on a header that corresponds to a property included in the first sequence and the second sequence, a fingerprint, a set of variable data including a timestamp associated with the first sequence and the second sequence, and traces of data in a preliminary model; and
   when the first sequence fails to match the second sequence, transmitting the second sequence to the central processing facility using a second channel of communication, the second sequence to be analyzed by the central processing facility to identify whether the second sequence is indicative of malware.

16. The method of claim 15, further including obtaining the model and a table including a relationship between the first sequence and a code.

17. The method of claim 16, further including encoding the second sequence using the code when the first sequence matches the second sequence.

18. The method of claim 15, wherein the model includes a plurality of sequences.

19. The method of claim 15, wherein the model is an encoded model, and further including parsing the model to identify the first sequence.

20. The method of claim 15, further including storing the second sequence for a period of time.

* * * * *